United States Patent
Milosevich

(10) Patent No.: US 12,400,513 B2
(45) Date of Patent: Aug. 26, 2025

(54) GAMING MACHINE AND METHOD WITH CROSS COLLECT FEATURE

(71) Applicant: LNW Gaming, Inc., Las Vegas, NV (US)

(72) Inventor: Richard Milosevich, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/543,246

(22) Filed: Dec. 6, 2021

(65) Prior Publication Data

US 2023/0177911 A1 Jun. 8, 2023

(51) Int. Cl.
*G07F 17/34* (2006.01)
*G06F 7/58* (2006.01)
*G07F 17/32* (2006.01)

(52) U.S. Cl.
CPC .......... *G07F 17/3213* (2013.01); *G06F 7/588* (2013.01); *G07F 17/3244* (2013.01); *G07F 17/3267* (2013.01); *G07F 17/34* (2013.01)

(58) Field of Classification Search
CPC ............. G07F 17/3213; G07F 17/3244; G07F 17/3267; G07F 17/34
USPC .......................................................... 463/31
See application file for complete search history.

(56) References Cited

U.S. PATENT DOCUMENTS

| | | | |
|---|---|---|---|
| 3,733,075 A | 5/1973 | Hooker et al. | |
| 4,198,052 A | 4/1980 | Gauselmann | |
| 4,732,386 A | 3/1988 | Rayfiel | |
| 5,100,137 A | 3/1992 | Fulton | |
| 5,152,529 A | 10/1992 | Okada | |
| 5,205,555 A | 4/1993 | Hamano | |
| 5,342,047 A | 8/1994 | Heidel et al. | |
| 5,356,140 A | 10/1994 | Dabrowski et al. | |
| 5,393,061 A | 2/1995 | Manship et al. | |

(Continued)

FOREIGN PATENT DOCUMENTS

| | | |
|---|---|---|
| AU | 2001055957 A1 | 3/2002 |
| AU | 2013251288 A1 | 5/2014 |

(Continued)

OTHER PUBLICATIONS

Ancient Arcadia game brochure, Copyright 2011 IGT.

(Continued)

*Primary Examiner* — Ryan Hsu

(57) ABSTRACT

There is provided a gaming system, gaming machine, and method that utilize an electronic display device configured to display a plurality of symbol-bearing reels. Using a random number generator, game-logic circuitry conducts a series of games comprising animating the spinning and stopping of the reels to place symbols in an array. The game-logic circuitry further animates column values and row values (e.g., in relation to the columns and rows of the array). Further, in response to appearance of a catalyst symbol in the array during one of the series of games, the game-logic circuitry determines an intersecting row and column for an entry location of the catalyst symbol within the array. The game-logic circuitry further awards a prize value based on a function of one of the column values that corresponds to the intersecting column and one of the row values that corresponds to the intersecting row.

19 Claims, 18 Drawing Sheets

(56) References Cited

U.S. PATENT DOCUMENTS

| | | |
|---|---|---|
| 5,395,111 A | 3/1995 | Inoue |
| 5,431,408 A | 7/1995 | Adams |
| 5,511,781 A | 4/1996 | Wood et al. |
| 5,618,232 A | 4/1997 | Martin |
| 5,695,188 A | 12/1997 | Ishibashi |
| 5,704,835 A | 1/1998 | Dietz |
| 5,722,891 A | 3/1998 | Inoue |
| 5,752,881 A | 5/1998 | Inoue |
| 5,766,074 A | 6/1998 | Cannon et al. |
| 5,788,573 A | 8/1998 | Baerlocher et al. |
| 5,807,177 A | 9/1998 | Takemoto et al. |
| 5,810,665 A | 9/1998 | Takemoto et al. |
| 5,833,537 A | 11/1998 | Barrie |
| 5,848,932 A | 12/1998 | Adams |
| 5,855,515 A | 1/1999 | Pease et al. |
| 5,876,284 A | 3/1999 | Acres et al. |
| 5,882,259 A | 3/1999 | Holmes et al. |
| 5,882,261 A | 3/1999 | Adams |
| 5,890,962 A | 4/1999 | Takemoto |
| 5,911,418 A | 6/1999 | Adams |
| 5,947,820 A | 9/1999 | Morro et al. |
| 5,951,397 A | 9/1999 | Dickinson |
| 5,988,638 A | 11/1999 | Rodesch et al. |
| 6,004,207 A | 12/1999 | Wilson et al. |
| 6,027,115 A | 2/2000 | Griswold et al. |
| 6,033,307 A | 3/2000 | Vancura |
| 6,048,269 A | 4/2000 | Burns et al. |
| 6,050,895 A | 4/2000 | Luciano et al. |
| 6,056,642 A | 5/2000 | Bennett |
| 6,089,976 A | 7/2000 | Schneider et al. |
| 6,089,977 A | 7/2000 | Bennett |
| 6,102,798 A | 8/2000 | Bennett |
| 6,120,031 A | 9/2000 | Adams |
| 6,142,873 A | 11/2000 | Weiss et al. |
| 6,159,097 A | 12/2000 | Gura |
| 6,162,121 A | 12/2000 | Morro et al. |
| 6,168,520 B1 | 1/2001 | Baerlocher et al. |
| 6,186,894 B1 | 2/2001 | Mayeroff |
| 6,203,429 B1 | 3/2001 | Demar et al. |
| 6,213,875 B1 | 4/2001 | Suzuki |
| 6,224,482 B1 | 5/2001 | Bennett |
| 6,224,483 B1 | 5/2001 | Mayeroff |
| 6,224,484 B1 | 5/2001 | Okuda et al. |
| 6,227,971 B1 | 5/2001 | Weiss |
| 6,241,607 B1 | 6/2001 | Payne et al. |
| 6,251,013 B1 | 6/2001 | Bennett |
| 6,270,411 B1 | 8/2001 | Gura et al. |
| 6,270,412 B1 | 8/2001 | Crawford et al. |
| 6,290,600 B1 | 9/2001 | Glasson |
| 6,309,300 B1 | 10/2001 | Glavich |
| 6,319,124 B1 | 11/2001 | Baerlocher et al. |
| 6,375,567 B1 | 4/2002 | Acres |
| 6,375,570 B1 | 4/2002 | Poole |
| 6,413,162 B1 | 7/2002 | Baerlocher et al. |
| 6,481,713 B2 | 11/2002 | Perrie et al. |
| 6,517,432 B1 | 2/2003 | Jaffe |
| 6,537,150 B1 | 3/2003 | Luciano et al. |
| 6,544,120 B2 | 4/2003 | Ainsworth |
| 6,547,242 B1 | 4/2003 | Sugiyama et al. |
| 6,551,187 B1 | 4/2003 | Jaffe |
| 6,554,704 B2 | 4/2003 | Nicastro et al. |
| 6,558,254 B2 | 5/2003 | Baelocher et al. |
| 6,561,900 B1 | 5/2003 | Baerlocher et al. |
| 6,561,904 B2 | 5/2003 | Locke et al. |
| 6,565,434 B1 | 5/2003 | Acres |
| 6,641,477 B1 | 11/2003 | Dietz |
| 6,652,378 B2 | 11/2003 | Cannon et al. |
| 6,656,040 B1 | 12/2003 | Brosnan et al. |
| 6,657,923 B2 | 12/2003 | Laughlin |
| 6,692,356 B2 | 2/2004 | Baerlocher et al. |
| 6,702,675 B2 | 3/2004 | Poole et al. |
| 6,731,313 B1 | 5/2004 | Kaminkow |
| 6,786,818 B1 | 9/2004 | Rothschild et al. |
| 6,832,957 B2 | 12/2004 | Falconer |
| 6,837,790 B1 | 1/2005 | Kaminkow |
| 6,869,360 B2 | 3/2005 | Marks et al. |
| 6,896,617 B2 | 5/2005 | Daly |
| 6,910,962 B2 | 6/2005 | Marks et al. |
| 6,916,243 B2 | 7/2005 | Yoshida |
| 6,918,834 B2 | 7/2005 | Vancura |
| 6,926,609 B2 | 8/2005 | Martin |
| 6,960,134 B2 | 11/2005 | Hartl et al. |
| 7,018,293 B2 | 3/2006 | Brown et al. |
| 7,029,395 B1 | 4/2006 | Baerlocher |
| 7,029,396 B2 | 4/2006 | Jaffe et al. |
| 7,121,945 B2 | 10/2006 | Suganuma et al. |
| 7,147,559 B2 | 12/2006 | Englman |
| 7,156,740 B2 | 1/2007 | Kaminkow |
| 7,179,169 B2 | 2/2007 | Beaulieu et al. |
| 7,252,591 B2 | 8/2007 | Van Asdale |
| 7,316,613 B2 | 1/2008 | Luccesi et al. |
| 7,371,170 B2 | 5/2008 | Cregan et al. |
| 7,377,850 B2 | 5/2008 | Shackelford et al. |
| 7,431,646 B2 | 10/2008 | Jackson |
| 7,452,276 B2 | 11/2008 | Loose et al. |
| 7,458,890 B2 | 12/2008 | Loose et al. |
| 7,488,252 B2 | 2/2009 | Griswold et al. |
| 7,503,847 B2 | 3/2009 | Baerlocher |
| 7,526,736 B2 | 4/2009 | Kaminkow et al. |
| 7,553,231 B2 | 6/2009 | Rodgers et al. |
| 7,578,735 B2 | 8/2009 | Frizzell et al. |
| 7,601,062 B2 | 10/2009 | Cole et al. |
| 7,604,538 B2 | 10/2009 | Pacey |
| 7,618,319 B2 | 11/2009 | Casey et al. |
| 7,625,278 B2 | 12/2009 | Paulsen et al. |
| 7,654,895 B2 | 2/2010 | Pacey |
| 7,654,899 B2 | 2/2010 | Durham et al. |
| 7,699,699 B2 | 4/2010 | Gilliland et al. |
| 7,704,141 B1 | 4/2010 | Marks et al. |
| 7,744,460 B2 | 6/2010 | Walker et al. |
| 7,785,191 B2 | 8/2010 | Marks et al. |
| 7,789,744 B2 | 9/2010 | Fiden |
| 7,841,934 B2 | 11/2010 | Gauselmann |
| 7,980,936 B2 | 7/2011 | Mead |
| 8,021,223 B2 | 9/2011 | Rose |
| 8,021,225 B2 | 9/2011 | Okada |
| 8,066,563 B1 | 11/2011 | Schultz et al. |
| 8,083,581 B2 | 12/2011 | Marks et al. |
| 8,105,145 B2 | 1/2012 | Jaffe |
| 8,105,151 B2 | 1/2012 | Caputo et al. |
| 8,113,940 B2 | 2/2012 | Hornik |
| 8,147,322 B2 | 4/2012 | Walker et al. |
| 8,162,740 B2 | 4/2012 | Aoki |
| 8,162,741 B2 | 4/2012 | Wadleigh et al. |
| 8,192,275 B2 | 6/2012 | Aoki et al. |
| 8,246,442 B1 | 8/2012 | Barrie |
| 8,272,938 B2 | 9/2012 | Gilmore et al. |
| 8,287,357 B2 | 10/2012 | Evans |
| 8,323,091 B2 | 12/2012 | Frank et al. |
| 8,357,041 B1 | 1/2013 | Saunders |
| 8,360,851 B2 | 1/2013 | Aoki et al. |
| 8,366,538 B1 | 2/2013 | Saunders et al. |
| 8,371,930 B1 | 2/2013 | Saunders et al. |
| 8,388,432 B2 | 3/2013 | Mattice et al. |
| 8,414,380 B2 | 4/2013 | Saunders et al. |
| 8,465,358 B2 | 6/2013 | Kemper |
| 8,496,522 B2 | 7/2013 | Caputo et al. |
| 8,512,121 B2 | 8/2013 | Macvittie et al. |
| 8,512,124 B2 | 8/2013 | Bramble et al. |
| 8,512,138 B2 | 8/2013 | Saunders |
| 8,523,659 B2 | 9/2013 | Evans |
| 8,574,059 B2 | 11/2013 | Rodgers et al. |
| 8,602,868 B2 | 12/2013 | Johnson et al. |
| 8,608,545 B2 | 12/2013 | Arora et al. |
| 8,662,986 B2 | 3/2014 | Rodgers et al. |
| 8,678,908 B2 | 3/2014 | Nicely |
| 8,690,660 B2 | 4/2014 | Saunders et al. |
| 8,696,434 B2 | 4/2014 | Tsukahara |
| 8,702,487 B2 | 4/2014 | Thomas |
| 8,790,169 B2 | 7/2014 | Saunders |
| 8,795,059 B2 | 8/2014 | Aoki et al. |
| 8,821,254 B2 | 9/2014 | Tsukahara |
| 8,834,258 B2 | 9/2014 | Gobe et al. |
| 8,851,974 B2 | 10/2014 | Caputo et al. |

(56) References Cited

U.S. PATENT DOCUMENTS

| | | |
|---|---|---|
| 8,870,642 B2 | 10/2014 | Leupp et al. |
| 8,882,578 B2 | 11/2014 | Saunders |
| 8,961,291 B2 | 2/2015 | Dias Pires et al. |
| 9,005,022 B2 | 4/2015 | Saunders |
| 9,011,233 B2 | 4/2015 | Ryan |
| 9,098,847 B2 | 8/2015 | Basallo et al. |
| 9,098,973 B2 | 8/2015 | Basallo et al. |
| 9,147,321 B2 | 9/2015 | Moody |
| 9,165,433 B2 | 10/2015 | Caputo |
| 9,177,447 B2 | 11/2015 | Zoltewicz et al. |
| 9,202,345 B2 | 12/2015 | Zoltewicz et al. |
| 9,214,011 B2 | 12/2015 | Wei et al. |
| 9,230,410 B2 | 1/2016 | Saunders et al. |
| 9,245,421 B2 | 1/2016 | Saunders et al. |
| 9,251,667 B2 | 2/2016 | Marks et al. |
| 9,257,017 B2 | 2/2016 | Saunders et al. |
| 9,262,895 B2 | 2/2016 | Rodgers et al. |
| 9,275,524 B2 | 3/2016 | Nicely |
| 9,299,224 B2 | 3/2016 | Leupp |
| 9,311,781 B2 | 4/2016 | Edwards |
| 9,349,251 B2 | 5/2016 | Caputo et al. |
| 9,355,528 B2 | 5/2016 | Nicely |
| 9,418,521 B1 | 8/2016 | Henrick et al. |
| 9,424,720 B2 | 8/2016 | Suda |
| 9,430,900 B2 | 8/2016 | Zoltewicz et al. |
| 9,466,169 B2 | 10/2016 | Basallo et al. |
| 9,474,972 B2 | 10/2016 | Lenger |
| 9,495,839 B2 | 11/2016 | Aoki et al. |
| 9,595,157 B2 | 3/2017 | Rasmussen et al. |
| 9,633,506 B2 | 4/2017 | Basallo et al. |
| 9,704,342 B2 | 7/2017 | Aoki et al. |
| 9,928,691 B2 | 3/2018 | Olive |
| 10,013,855 B2 | 7/2018 | Nakamura |
| 10,037,651 B2 | 7/2018 | You et al. |
| 10,043,350 B2 | 8/2018 | Gomez et al. |
| 10,062,237 B2 | 8/2018 | Devine et al. |
| 10,204,473 B2 | 2/2019 | Lenger |
| 10,242,533 B2 | 3/2019 | Okada et al. |
| 10,339,761 B2 | 7/2019 | Olive |
| 10,366,575 B2 | 7/2019 | Visser |
| 10,388,112 B2 | 8/2019 | You et al. |
| 10,410,472 B2 | 9/2019 | Moody |
| 10,417,877 B2 | 9/2019 | Gomez et al. |
| 10,475,294 B2 | 11/2019 | Gomez et al. |
| 10,497,203 B2 | 12/2019 | Elmqvist |
| 10,672,220 B2 | 6/2020 | Lenger |
| 10,706,664 B2 | 7/2020 | Boese et al. |
| 10,726,676 B2 | 7/2020 | You et al. |
| 10,769,888 B2 | 9/2020 | You et al. |
| 10,839,648 B2 | 11/2020 | Okada et al. |
| 10,957,161 B2 | 3/2021 | Chesworth et al. |
| 11,017,638 B2 | 5/2021 | Chesworth et al. |
| 2001/0021666 A1 | 9/2001 | Yoshida et al. |
| 2002/0016200 A1 | 2/2002 | Baerlocher et al. |
| 2002/0045474 A1 | 4/2002 | Singer et al. |
| 2002/0119818 A1 | 8/2002 | Savio et al. |
| 2002/0155881 A1 | 10/2002 | Yoshida |
| 2002/0183105 A1 | 12/2002 | Cannon et al. |
| 2003/0017865 A1 | 1/2003 | Beaulieu et al. |
| 2003/0027619 A1 | 2/2003 | Nicastro, Sr. |
| 2003/0035346 A1 | 2/2003 | Laughlin |
| 2003/0064771 A1* | 4/2003 | Morrow ................ G07F 17/323 463/16 |
| 2003/0064782 A1 | 4/2003 | Beaulieu et al. |
| 2003/0064801 A1 | 4/2003 | Breckner et al. |
| 2003/0064802 A1 | 4/2003 | Rodgers et al. |
| 2003/0069063 A1 | 4/2003 | Bilyeu et al. |
| 2003/0130025 A1* | 7/2003 | Gilmore ............. G07F 17/3262 463/16 |
| 2003/0130034 A1 | 7/2003 | Suganuma et al. |
| 2003/0157980 A1 | 8/2003 | Loose et al. |
| 2003/0216165 A1 | 11/2003 | Singer et al. |
| 2004/0012145 A1 | 1/2004 | Inoue |
| 2004/0023714 A1 | 2/2004 | Asdale |
| 2004/0043815 A1 | 3/2004 | Kaminkow |
| 2004/0048646 A1 | 3/2004 | Visocnik |
| 2004/0092315 A1 | 5/2004 | Boyd et al. |
| 2004/0137982 A1 | 7/2004 | Cuddy et al. |
| 2004/0171417 A1 | 9/2004 | Beaulieu et al. |
| 2004/0198489 A1 | 10/2004 | Kaminkow et al. |
| 2005/0054442 A1 | 3/2005 | Anderson et al. |
| 2005/0130731 A1 | 6/2005 | Englman et al. |
| 2005/0148383 A1* | 7/2005 | Mayeroff ................ G07F 17/32 463/20 |
| 2005/0159208 A1 | 7/2005 | Pacey |
| 2006/0009286 A1 | 1/2006 | Durham et al. |
| 2006/0063588 A1 | 3/2006 | Poole |
| 2006/0111173 A1 | 5/2006 | Yang |
| 2006/0142080 A1 | 6/2006 | Enzminger |
| 2006/0189369 A1 | 8/2006 | Taylor |
| 2006/0205469 A1 | 9/2006 | Schultz et al. |
| 2006/0247002 A1 | 11/2006 | Yoshimi et al. |
| 2007/0060248 A1 | 3/2007 | Rodgers et al. |
| 2007/0060255 A1 | 3/2007 | Baerlocher et al. |
| 2007/0060275 A1 | 3/2007 | Gilmore et al. |
| 2007/0129135 A1 | 6/2007 | Marks et al. |
| 2007/0149267 A1 | 6/2007 | Ross et al. |
| 2007/0281784 A1 | 12/2007 | Seelig et al. |
| 2007/0287529 A1 | 12/2007 | Kojima |
| 2008/0003278 A1 | 1/2008 | Mondelo |
| 2008/0004532 A1 | 1/2008 | Rubey et al. |
| 2008/0032784 A1 | 2/2008 | Englman |
| 2008/0045298 A1 | 2/2008 | Yoshizawa |
| 2008/0045320 A1 | 2/2008 | Kato |
| 2008/0108408 A1 | 5/2008 | Wolf |
| 2008/0108411 A1 | 5/2008 | Jensen et al. |
| 2008/0108422 A1 | 5/2008 | Hedrick et al. |
| 2008/0108431 A1 | 5/2008 | Cuddy et al. |
| 2008/0132321 A1 | 6/2008 | Pau |
| 2008/0182647 A1 | 7/2008 | Brunet De Courssou et al. |
| 2008/0274789 A1 | 11/2008 | Singer et al. |
| 2009/0036208 A1 | 2/2009 | Pennington et al. |
| 2009/0156287 A1 | 6/2009 | Baumgartner |
| 2009/0181755 A1 | 7/2009 | Gagner et al. |
| 2009/0239634 A1 | 9/2009 | Nguyen |
| 2009/0291741 A1 | 11/2009 | Schofield |
| 2010/0075737 A1 | 3/2010 | Bluemel |
| 2010/0113133 A1 | 5/2010 | Leupp |
| 2010/0167815 A1 | 7/2010 | Gagner et al. |
| 2010/0203948 A1 | 8/2010 | Falciglia, Sr. |
| 2010/0210343 A1 | 8/2010 | Englman et al. |
| 2010/0234092 A1 | 9/2010 | Gomez et al. |
| 2010/0304832 A1 | 12/2010 | Kup-Ferroth |
| 2011/0244943 A1 | 10/2011 | Milford et al. |
| 2011/0300937 A1 | 12/2011 | Crowder, Jr. et al. |
| 2012/0015707 A1 | 1/2012 | Hornik et al. |
| 2012/0034965 A1 | 2/2012 | Masen et al. |
| 2012/0077564 A1 | 3/2012 | Collette et al. |
| 2012/0094738 A1 | 4/2012 | Aoki et al. |
| 2012/0122532 A1 | 5/2012 | Berman et al. |
| 2012/0178517 A1 | 7/2012 | Montenegro et al. |
| 2012/0220360 A1 | 8/2012 | Kelly et al. |
| 2013/0045784 A1* | 2/2013 | Napolitano ............ A63F 3/065 463/17 |
| 2013/0053124 A1 | 2/2013 | Masen et al. |
| 2013/0065663 A1 | 3/2013 | Johnson et al. |
| 2013/0102375 A1 | 4/2013 | Aoki et al. |
| 2013/0252704 A1 | 9/2013 | Gilbertson et al. |
| 2013/0260861 A1 | 10/2013 | Vann et al. |
| 2013/0324217 A1 | 12/2013 | Gilbertson et al. |
| 2014/0014186 A1 | 1/2014 | Bhattacharya et al. |
| 2014/0024429 A1 | 1/2014 | Aoki et al. |
| 2014/0051496 A1 | 2/2014 | Meyer |
| 2014/0141860 A1 | 5/2014 | Meyer |
| 2014/0179396 A1 | 6/2014 | Aoki et al. |
| 2014/0274292 A1 | 9/2014 | Suda |
| 2014/0323198 A1 | 10/2014 | Tuck |
| 2015/0031437 A1 | 1/2015 | Gomez et al. |
| 2015/0170462 A1 | 6/2015 | Berman et al. |
| 2015/0206386 A1 | 7/2015 | Jaffe et al. |
| 2015/0269809 A1 | 9/2015 | Smith |
| 2015/0287269 A1 | 10/2015 | Berman |
| 2015/0356833 A1 | 12/2015 | Aoki et al. |
| 2015/0379831 A1 | 12/2015 | Lee et al. |

(56) References Cited

U.S. PATENT DOCUMENTS

| | | |
|---|---|---|
| 2016/0042597 A1 | 2/2016 | Olive |
| 2016/0155303 A1 | 6/2016 | Aoki et al. |
| 2017/0124799 A1* | 5/2017 | Berman .............. G07F 17/3213 |
| 2017/0154498 A1 | 6/2017 | Olive |
| 2017/0372558 A1 | 12/2017 | You et al. |
| 2018/0130303 A1 | 5/2018 | Lamb |
| 2018/0268655 A1 | 9/2018 | Olive |
| 2018/0268659 A1 | 9/2018 | Chesworth et al. |
| 2019/0096168 A1* | 3/2019 | Salmon ................... G07F 17/34 |
| 2019/0102992 A1 | 4/2019 | You et al. |
| 2019/0236905 A1 | 8/2019 | Washington et al. |
| 2021/0097815 A1* | 4/2021 | Thomas .............. G07F 17/3272 |
| 2021/0097816 A1* | 4/2021 | Burns ................ G07F 17/3237 |

FOREIGN PATENT DOCUMENTS

| | | |
|---|---|---|
| AU | 2014202042 A1 | 5/2014 |
| AU | 2015210489 A1 | 2/2016 |
| GB | 2097160 A | 10/1982 |
| GB | 2097160 B | 5/1984 |
| GB | 2144568 A | 3/1985 |
| GB | 2144568 B | 9/1985 |
| GB | 2251112 A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.

* cited by examiner

GAMING MACHINE AND METHOD WITH CROSS COLLECT FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD OF THE INVENTION

The present invention relates to a technological improvement to gaming systems, gaming machines, and methods and, more particularly, to new and improved animations in connection with a symbol array feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that utilize an electronic display device configured to display a plurality of symbol-bearing reels. Using a random number generator, game-logic circuitry conducts a series of games comprising animating the spinning and stopping of the reels to place symbols in an array. The game-logic circuitry further animates column values and row values (e.g., in relation to the columns and rows of the array). Further, in response to appearance of a catalyst symbol in the array during one of the series of games, the game-logic circuitry determines an intersecting row and column for an entry location of the catalyst symbol within the array. The game-logic circuitry further awards a prize value based on a function of one of the column values that corresponds to the intersecting column and one of the row values that corresponds to the intersecting row.

Additional aspects of the invention will be apparent to those of ordinary skill in the art in view of the detailed description of various embodiments, which is made with reference to the drawings, a brief description of which is provided below.

Figure 1:
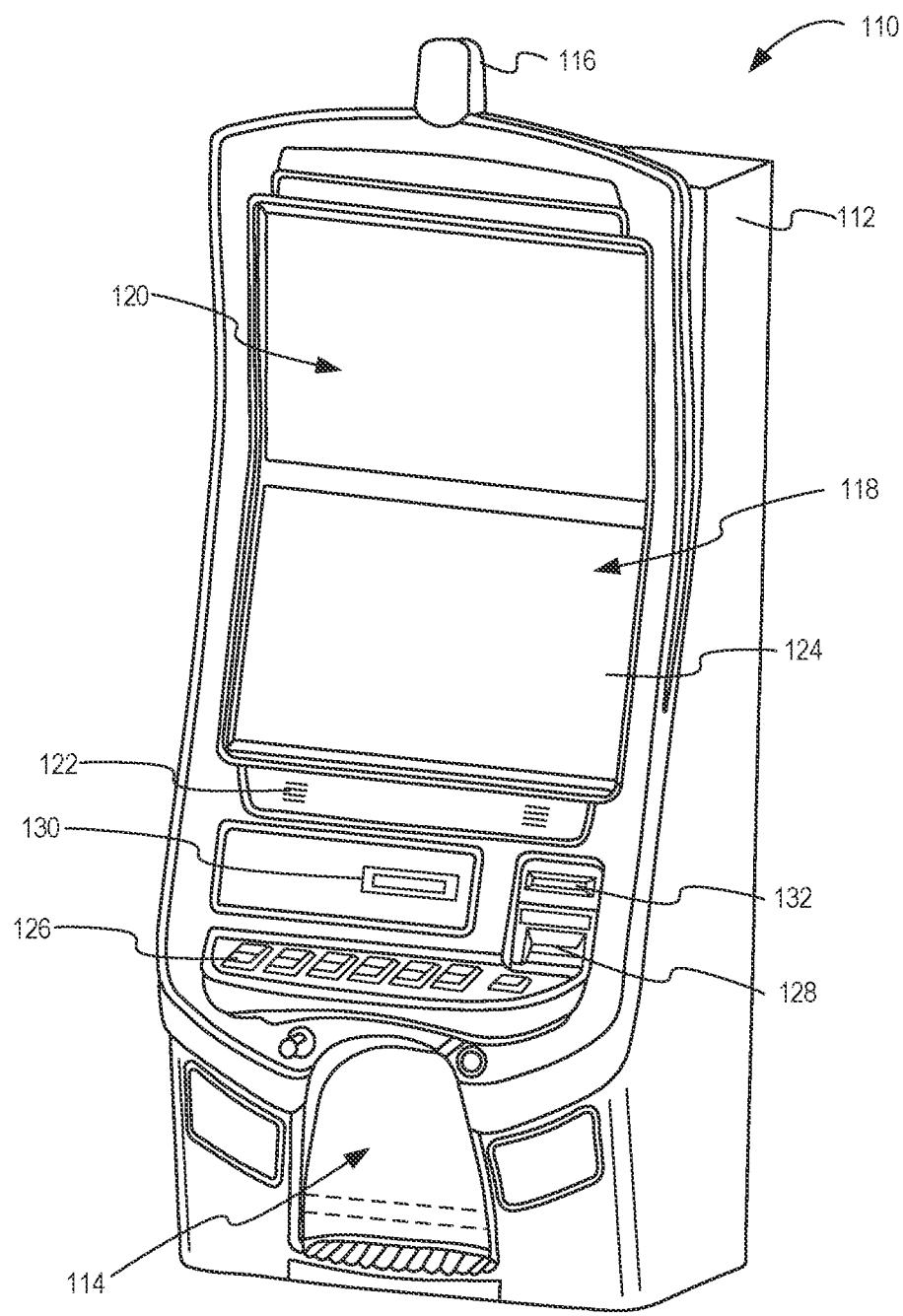
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling,"

"slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 110 similar to those operated in gaming establishments, such as casinos. With regard to the present invention, the gaming machine 110 may be any type of gaming terminal or machine and may have varying structures and methods of operation. For example, in some aspects, the gaming machine 110 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 110 may take any suitable form, such as floor-standing models as shown, handheld mobile units, bartop models, workstation-type console models, etc. Further, the gaming machine 110 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 110 illustrated in FIG. 1 comprises a gaming cabinet 112 that securely houses various input devices, output devices, input/output devices, internal electronic/electromechanical components, and wiring. The cabinet 112 includes exterior walls, interior walls and shelves for mounting the internal components and managing the wiring, and one or more front doors that are locked and require a physical or electronic key to gain access to the interior compartment of the cabinet 112 behind the locked door. The cabinet 112 forms an alcove 114 configured to store one or more beverages or personal items of a player. A notification mechanism 116, such as a candle or tower light, is mounted to the top of the cabinet 112. It flashes to alert an attendant that change is needed, a hand pay is requested, or there is a potential problem with the gaming machine 110.

The input devices, output devices, and input/output devices are disposed on, and securely coupled to, the cabinet 112. By way of example, the output devices include a primary display 118, a secondary display 120, and one or more audio speakers 122. The primary display 118 or the secondary display 120 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 110. The gaming machine 110 includes a touch screen(s) 124 mounted over the primary or secondary displays, buttons 126 on a button panel, a bill/ticket acceptor 128, a card reader/writer 130, a ticket dispenser 132, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 124, buttons 126, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 110 includes one or more value input/payment devices and value output/payout devices. In order to deposit cash or credits onto the gaming machine 110, the value input devices are configured to detect a physical item associated with a monetary value that establishes a credit balance on a credit meter such as the "credits" meter 184 (see FIG. 5). The physical item may, for example, be currency bills, coins, tickets, vouchers, coupons, cards, and/or computer-readable storage mediums. The deposited cash or credits are used to fund wagers placed on the wagering game played via the gaming machine 110. Examples of value input devices include, but are not limited to, a coin acceptor, the bill/ticket acceptor 128, the card reader/writer 130, a wireless communication interface for reading cash or credit data from a nearby mobile device, and a network interface for withdrawing cash or credits from a remote account via an electronic funds transfer. In response to a cashout input that initiates a payout from the credit balance on the "credits" meter, the value output devices are used to dispense cash or credits from the gaming machine 110. The credits may be exchanged for cash at, for example, a cashier or redemption station. Examples of value output devices include, but are not limited to, a coin hopper for dispensing coins or tokens, a bill dispenser, the card reader/writer 130, the ticket dispenser 132 for printing tickets redeemable for cash or credits, a wireless communication interface for transmitting cash or credit data to a nearby mobile device, and a network interface for depositing cash or credits to a remote account via an electronic funds transfer.

Figure 2:
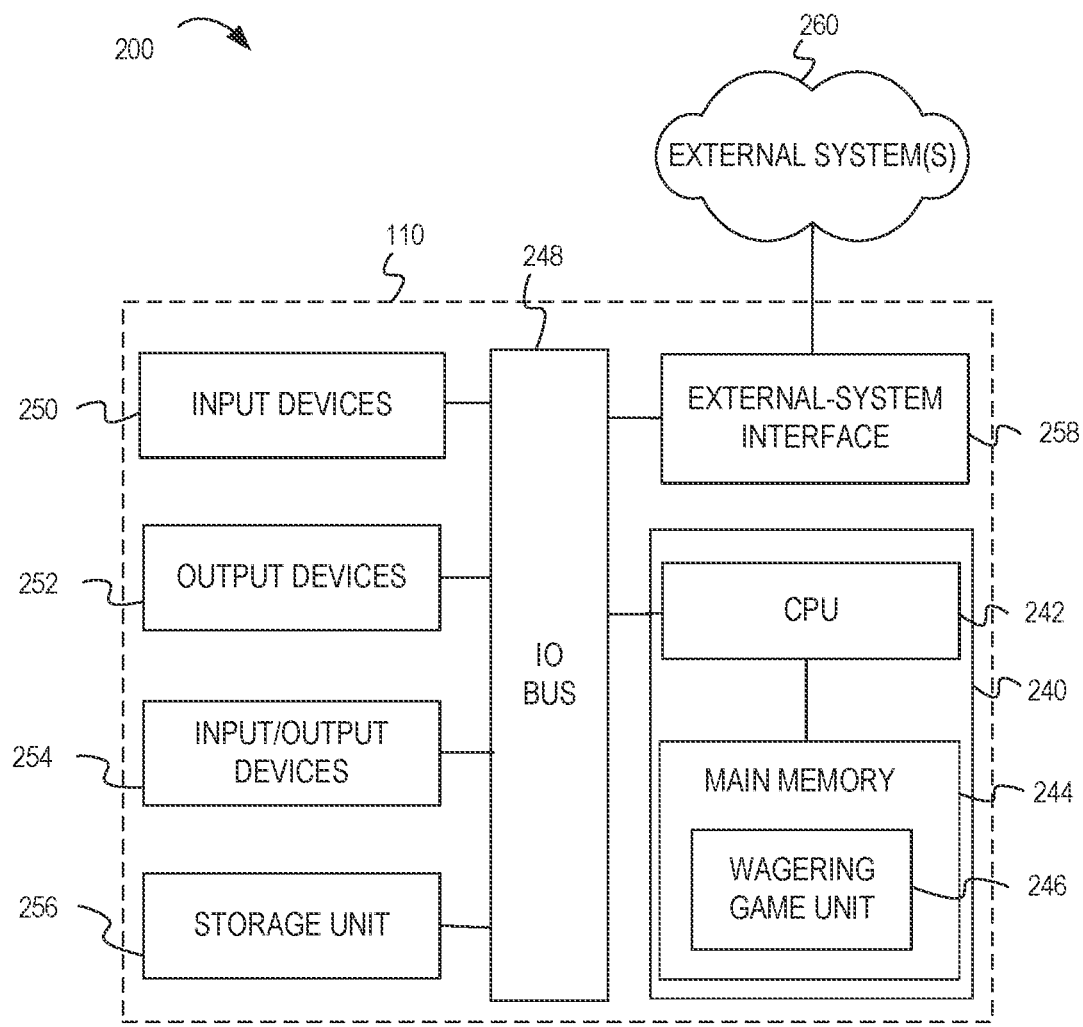
FIG. 2 is a schematic view of a gaming system according to an embodiment of the present invention.

Turning now to FIG. 2, there is shown a block diagram of the gaming-machine architecture 200. The gaming machine 110 includes game-logic circuitry 240 securely housed within a locked box inside the gaming cabinet 112 (see FIG. 1). The game-logic circuitry 240 includes a central processing unit (CPU) 242 connected to a main memory 244 that comprises one or more memory devices. The CPU 242 includes any suitable processor(s), such as those made by Intel and AMD. By way of example, the CPU 242 includes a plurality of microprocessors including a master processor, a slave processor, and a secondary or parallel processor.

Game-logic circuitry 240, as used herein, comprises any combination of hardware, software, or firmware disposed in or outside of the gaming machine 110 that is configured to communicate with or control the transfer of data between the gaming machine 110 and a bus, another computer, processor, device, service, or network. The game-logic circuitry 240, and more specifically the CPU 242, comprises one or more controllers or processors and such one or more controllers or processors need not be disposed proximal to one another and may be located in different devices or in different locations. The game-logic circuitry 240, and more specifically the main memory 244, comprises one or more memory devices which need not be disposed proximal to one another and may be located in different devices or in different locations. The game-logic circuitry 240 is operable to execute all of the various gaming methods and other processes disclosed herein. The main memory 244 includes a wagering-game unit 246. In one embodiment, the wagering-game unit 246 causes wagering games to be presented, such as video poker, video black jack, video slots, video lottery, etc., in whole or part.

The game-logic circuitry 240 is also connected to an input/output (I/O) bus 248, which can include any suitable bus technologies, such as an AGTL+ frontside bus and a PCI backside bus. The I/O bus 248 is connected to various input devices 250, output devices 252, and input/output devices 254 such as those discussed above in connection with FIG. 1. The I/O bus 248 is also connected to a storage unit 256 and an external-system interface 258, which is connected to one or more external systems (external system(s) 260) (e.g., wagering-game networks).

The external system(s) 260 include, in various aspects, a gaming network, other gaming machines or terminals, a gaming server, a remote controller, communications hardware, or a variety of other interfaced systems or components, in any combination. In yet other aspects, the external system(s) 260 comprise a player's portable electronic device (e.g., cellular phone, electronic wallet, etc.) and the external-system interface 258 is configured to facilitate wireless communication and data transfer between the portable electronic device and the gaming machine 110, such as by a near-field communication path operating via magnetic-field induction or a frequency-hopping spread spectrum RF signals (e.g., Bluetooth, etc.).

The gaming machine 110 optionally communicates with the external system(s) 260 such that the gaming machine 110 operates as a thin, thick, or intermediate client. The game-logic circuitry 240—whether located within ("thick client"), external to ("thin client"), or distributed both within and external to ("intermediate client") the gaming machine 110—is utilized to provide a wagering game on the gaming machine 110. In general, the main memory 244 stores programming for a random number generator (RNG), game-outcome logic, and game assets (e.g., art, sound, etc.)—all of which obtained regulatory approval from a gaming control board or commission and are verified by a trusted authentication program in the main memory 244 prior to game execution. The authentication program generates a live authentication code (e.g., digital signature or hash) from the memory contents and compare it to a trusted code stored in the main memory 244. If the codes match, authentication is deemed a success and the game is permitted to execute. If, however, the codes do not match, authentication is deemed a failure that must be corrected prior to game execution. Without this predictable and repeatable authentication, the gaming machine 110, external system(s) 260, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 242 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 242 when executing the game-outcome logic to determine a resultant outcome for that instance of the wagering game. The resultant outcome is then presented to a player of the gaming machine 110 by accessing the associated game assets, required for the resultant outcome, from the main memory 244. The CPU 242 causes the game assets to be presented to the player as outputs from the gaming machine 110 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 110 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 110 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 110 depicted in FIG. 1, following receipt of an input from the player to initiate a wagering-game instance. The gaming machine 110 then communicates the wagering-game outcome to the player via one or more output devices (e.g., primary display 118 or secondary display 120) through the display of information such as, but not limited to, text, graphics, static images, moving images, etc., or any combination thereof. In accord with the method of conducting the wagering game, the game-logic circuitry 240 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 240 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 242 causes the recording of a digital representation of the wager in one or more storage media (e.g., storage unit 256), the CPU 242, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 242 (e.g., the wager in the present example). As another example, the CPU 242 further, in accord with the execution of the stored instructions relating to the wagering game, causes the primary display 118, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 240 to determine the outcome of the wagering-game instance. In at least some aspects, the game-logic circuitry 240 is configured to determine an outcome of the wagering-game instance at least partially in response to the random parameter.

In one embodiment, the gaming machine 110 and, additionally or alternatively, the external system(s) 260 (e.g., a gaming server), means gaming equipment that meets the hardware and software requirements for fairness, security, and predictability as established by at least one state's gaming control board or commission. Prior to commercial deployment, the gaming machine 110, the external system(s) 260, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 110 may be implemented with hardware and software architectures, circuitry, and other special features that differentiate it from general-purpose computers (e.g., desktop PCs, laptops, and tablets).

Figure 3:
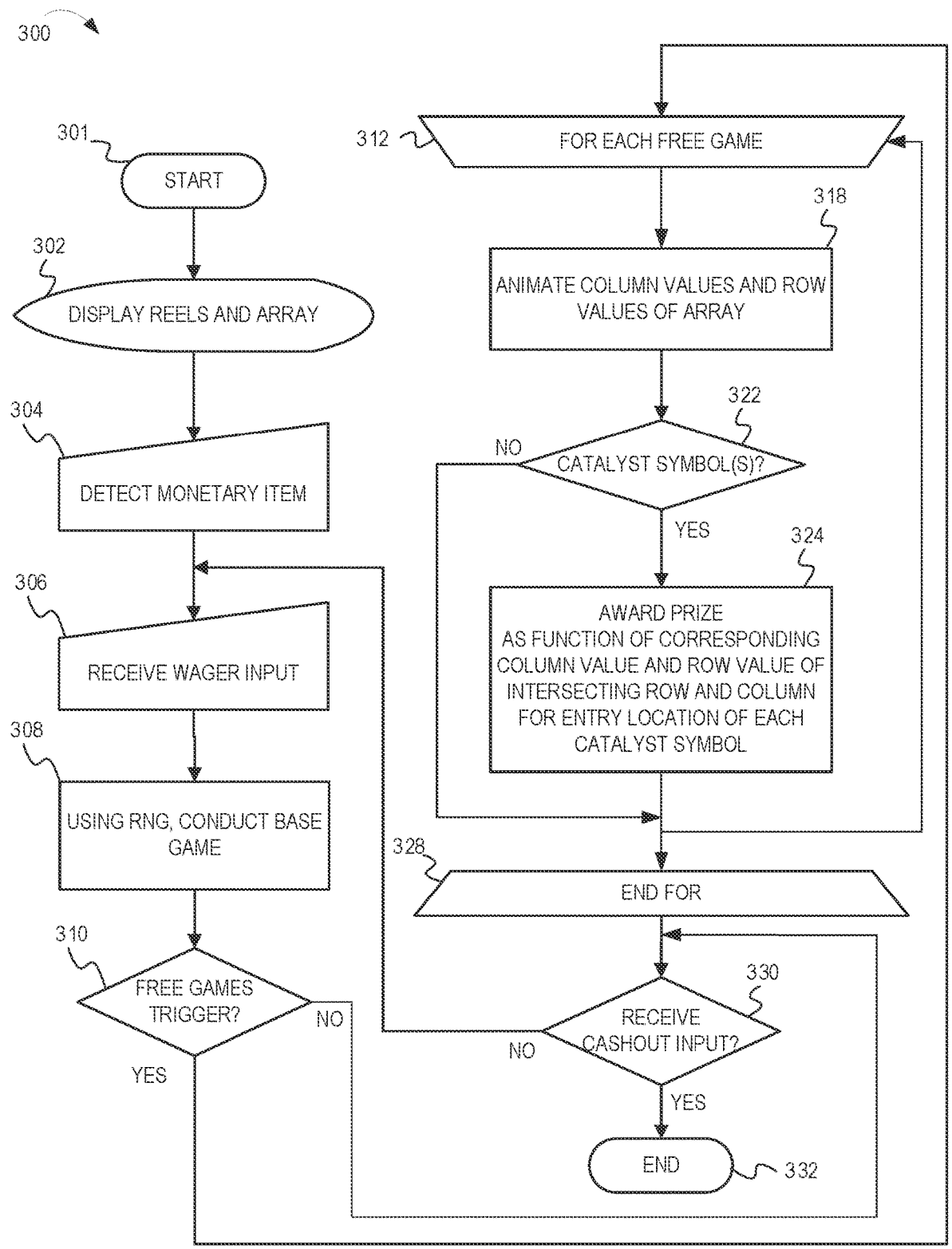
FIG. 3 is a flowchart for an algorithm that corresponds to instructions executed by a controller, according to an embodiment of the present invention.

Referring now to FIG. 3, there is shown a flowchart representing one data processing method flow ("flow 300") corresponding to at least some instructions stored and executed by the game-logic circuitry 240 in FIG. 2 to perform operations according to an embodiment of the present invention. The operations are described below in conjunction with FIGS. 4, 5A, 5B, 6, 7, 8, 9, 10, 11, and 12 which depict diagrams associated with one or more game features (e.g. a game cycle and/or series of game cycles) illustrating aspects of this embodiment.

Figure 5A:
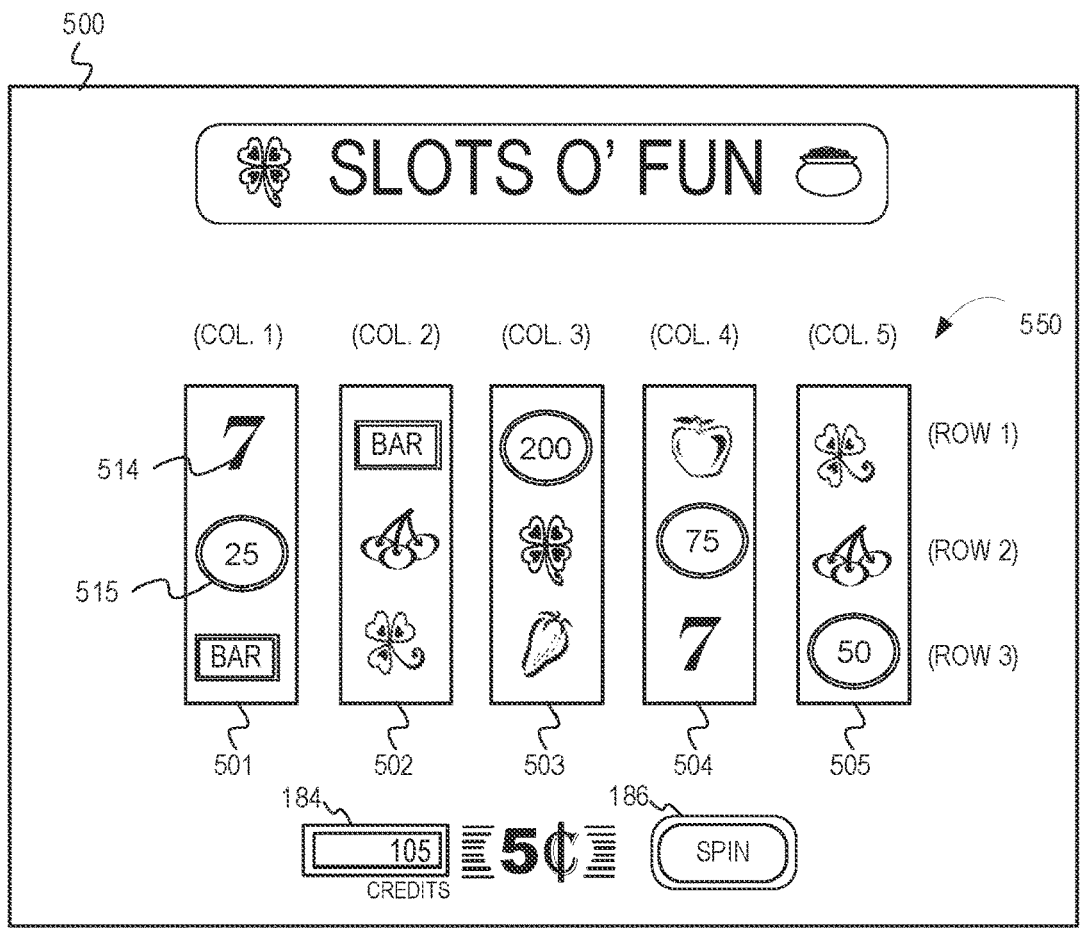
FIGS. 5A, 5B, 6, and 7 are diagrams of game features illustrating aspects of the embodiment in FIG. 3 and/or FIG. 4.

The flow 300 commences at processing block 301. At processing block 302, the game-logic circuitry directs an electronic display device (e.g., video display) of the gaming machine to display a plurality of symbol-bearing reels and an array of symbol positions. The array of symbol positions comprises a plurality of rows and columns. In some embodiments, the rows of the array are oriented in a horizontal direction, and the columns of the array are oriented in a generally vertical direction. In the example shown in FIG. 5A, an electronic display device 500 displays five symbol-bearing reels 501. 502, 503, 504 and 505 arranged from left to right and associated with respective columns of a 3×5 array 550 that includes three rows and five columns. As shown in FIG. 5A, the symbol positions in each row of the array 550 are horizontally aligned with each other, and the symbol positions in each column of the array 550 are vertically aligned with each other. The reels 501. 502, 503, 504 and 505 may be associated with the respective columns of the array 550 such that the reels spin vertically and each reel populates a respective column. The reel spin is animated by depicting symbol-bearing strips moving vertically across the display and synchronously updating the symbols visible on each strip as the strip moves across the display. In another embodiment, the reels 501. 502, 503, 504 and 505 may be associated with the respective rows of the array 550 such that the reels 501. 502, 503, 504 and 505 spin horizontally and each reel populates a respective row. In yet another embodiment, the reels 501. 502, 503, 504 and 505 may be associated with respective individual symbol positions of the array such that each reel populates only its respective symbol position.

Figure 5B:
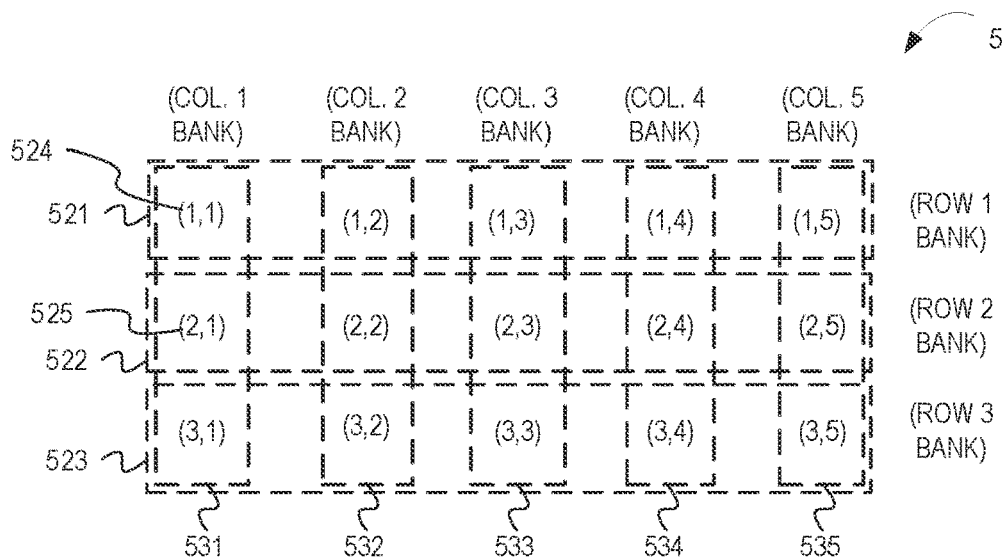

FIG. 5B illustrates an example game array model 520 having columns 531, 532, 533, 534, and 535 (which are vertically oriented) and rows 521, 522, and 523 (which are horizontally oriented). The game array model 520 may be used as a template for positioning symbols and/or as a reference for determining, and computing, a function of intersecting row and column values for special symbols that appear in the array 550. Each element (or entry) of the array model 520 has a respective index value representing intersecting points of the columns 531, 532, 533, 534, and 535 and rows 521, 522, and 523. Each of the symbol positions that appears on the reels 501, 502, 503, 503, and 505 correlates to a respective entry location, thus to a unique array index value, which can be considered in this description as coordinates, or location points, at which to position and present symbols via the electronic display device 500. The columns 531, 532, 533, 534, and 535 correlate, or map, to the positions and orientation of the reels 501, 502, 503, 504, and 505 and the symbol positions in the array 550 correlate, or map, to the positions of the entries of the array model 520. For example, column 531 may be considered a first column, and row 521 may be considered a first row, thus the index value 524 (i.e., (1,1)) refers to the index value for the intersecting point of the first column and the first row of the game array model 520. The coordinates of the symbol 514, within the array 550, corresponds to the index value 524 (i.e., (1,1)) from the game array model 520; the coordinates of the symbol 515, within the game array 550, correspond to the index value 525 (i.e., (2,1)) of the game array model 520; and so forth. The game array model 520 may also be used for relative positioning of images of column and/or row values relative to the array 550, such as for positioning images of column banks (e.g., credit banks 601, 602, 603, 604, and 605 as described in FIG. 6) or for positioning images of row banks (e.g., multiplier banks 701, 702, and 703 as described in FIG. 7). Further, in some embodiments, the game array model 520 may be used to determine an intersecting location point for a row and column associated with a special symbol and to compute a function of the respective column value and row value. Although the game array model 520 illustrates the columns 531, 531, 533, 534, and 534 as vertical and the rows 521, 522, and 523 as horizontal, alternatively, the "rows" of the array may be oriented in a vertical direction, and the "columns" of the array may be oriented in a horizontal direction.

Referring again to FIG. 3, at processing block 304, the game-logic circuitry detects, via at least one of one or more electronic input devices, a physical item associated with a monetary value that establishes a credit balance. As shown in FIG. 5, the credit balance may be shown on a credit meter 184 of the gaming machine.

At processing block 306, the game-logic circuitry initiates a wagering game cycle in response to an input indicative of a wager covered by the credit balance. To initiate a spin of the reels, the player may press a "Spin" or "Max Bet" key on a button panel or touch screen (e.g., the spin button 186).

At processing block 308, using an RNG, the game-logic circuitry conducts a base game by animating the spinning and stopping of the plurality of symbol-bearing reels to randomly land symbols on the reels in the array 550. In some embodiments, the symbol land in visual association with one or more paylines (also known as lines, ways, patterns, or arrangements). The game-logic circuitry is configured to evaluate the displayed array of symbols and provide immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array. Each payline preferably consists of a single symbol position in each column of the array. The number of paylines may be as few as one or as many as possible given each payline consists of a single symbol position in each column of the array. In a 3×5 array with three rows and five columns, the maximum number of such paylines is $3^5=243$ lines. In some embodiments, the game-logic circuitry determines awards based on a pre-configured subset of the possible paylines. In some embodiments, the game-logic circuitry presents special symbols that can provide immediate or accumulative awards. The special symbols may include values, thereon, to indicate a what-you-see-is-what-you-get (WYSIWYG) visual presentation. FIG. 5A illustrates the reels 501, 502, 503, 504 and 505 after they have been spun and stopped to randomly populate the array 550 with symbols.

Figure 6:
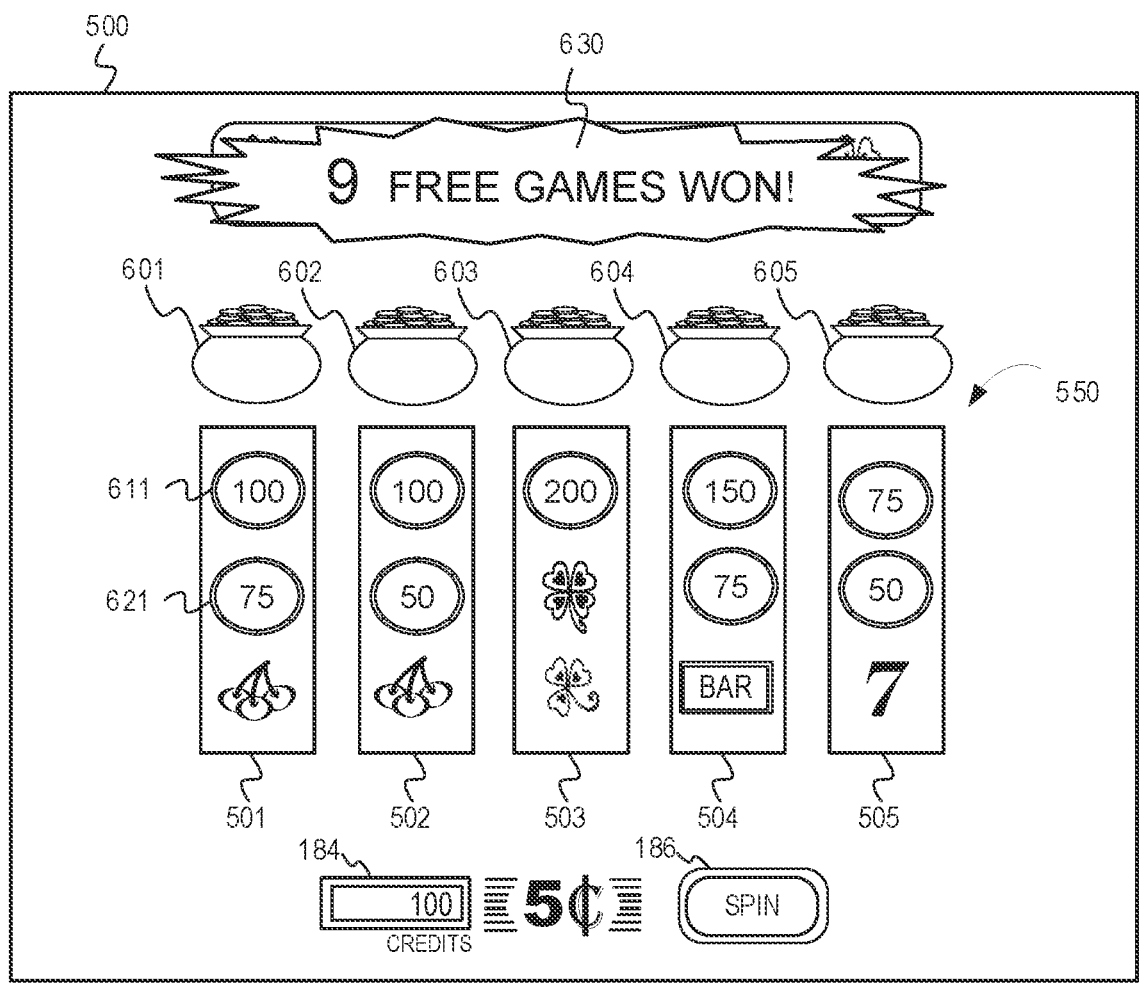

At step 310, the game-logic circuitry determines whether or not a series of free games have been triggered. If the series of free games has not been triggered at step 310, the data processing method proceeds to step 330. If, however, the series of free games has been triggered at step 310, the data processing method proceeds to step 312. In one embodiment, the series of free games is triggered by appearance of a certain number of a special type of symbol within the array 550. In the example shown in FIG. 6, the special symbol used to trigger the free games may be a value-bearing symbol. Symbols 611 and 612 are examples of a value-bearing symbol that bears (or displays) a specific credit value (which credit value can vary per symbol). The symbol 611, for example, bears a value of "100" which represents one-hundred game credits. The symbol 612, for example, bears a value of "75" which represents seventy-five game credits. Nine value-bearing symbols appear in the array 550 as shown in FIG. 6. The game-logic circuitry determines that a certain number of value-bearing symbols that appear in the base game meets or exceeds a minimum, or threshold, number, such as five. As shown in FIG. 6, nine different value-bearing symbols appear (i.e., nine different value-bearing symbols appear in the array 550, which each value-bearing symbol bearing a credit value). Nine symbols exceeds the minimum number of five symbols, thus the free games are triggered. In other embodiments, the series of free games may be triggered by other triggering events such as a single triggering symbol anywhere in the array, a single triggering symbol in a particular position in the array (e.g., on the rightmost reel along an active payline), scatter triggers, mystery events, etc. In some embodiments, the number of the free games equates to the number of value-bearing symbols that appeared in the first game. Thus, for the example in FIG. 6, because nine value-bearing symbols appeared, then nine free games are provided (as indicated by the game notification message 630). The game-logic circuitry also animates column banks 601, 602, 603, 604, and 605 to appear above the columns of the array 550 (e.g., above each respective reel 501, 502, 503, 504, and 505). The column banks 601, 602, 603, 604, and 605 will be used to accrue credit values from each of the value-bearing symbols that appear in the respective columns (e.g., see FIG. 7 or FIG. 10).

Figure 4:
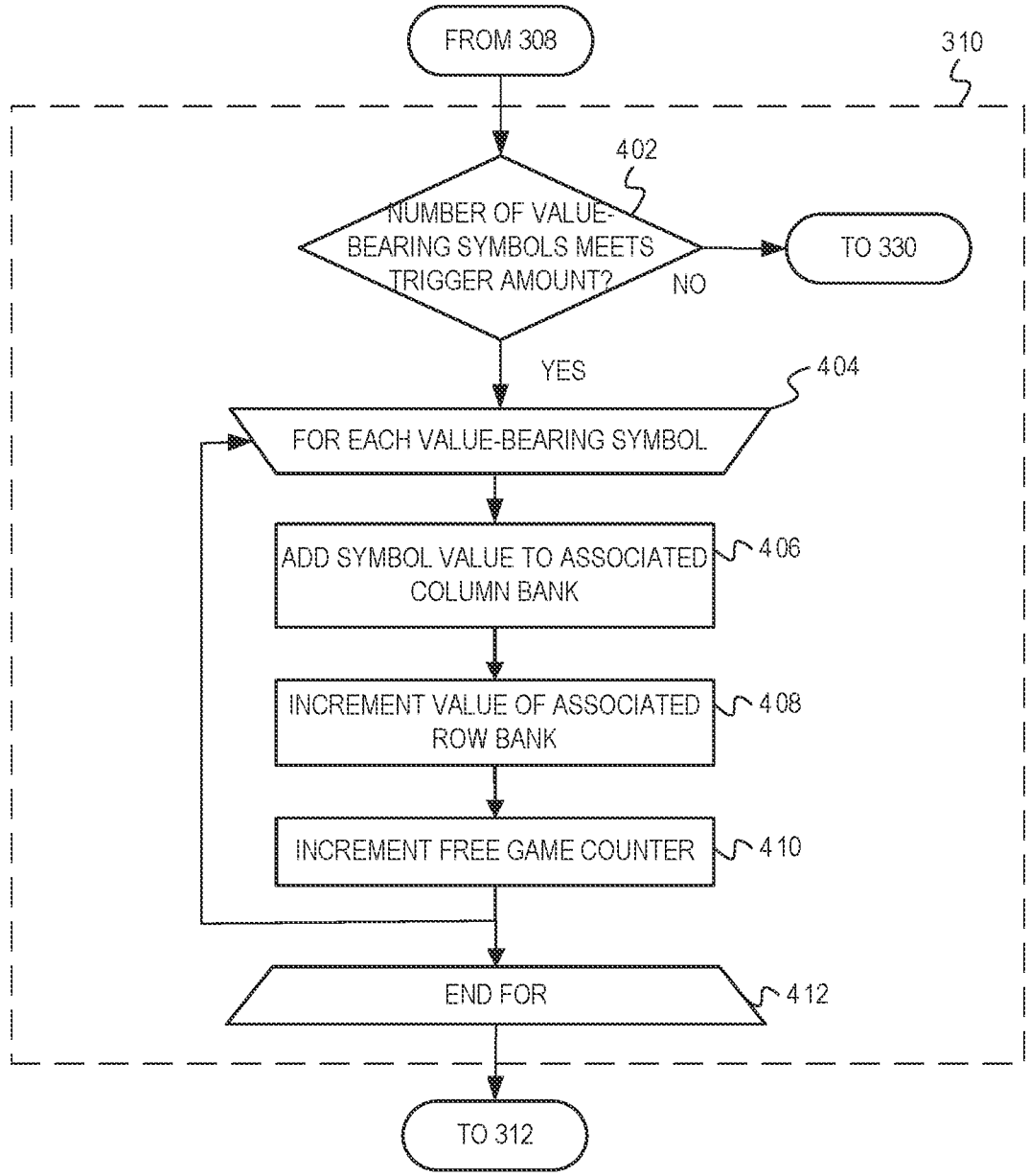
FIG. 4 is a flowchart for an algorithm that corresponds to instructions executed by a controller, according to an embodiment of the present invention.
Figure 7:
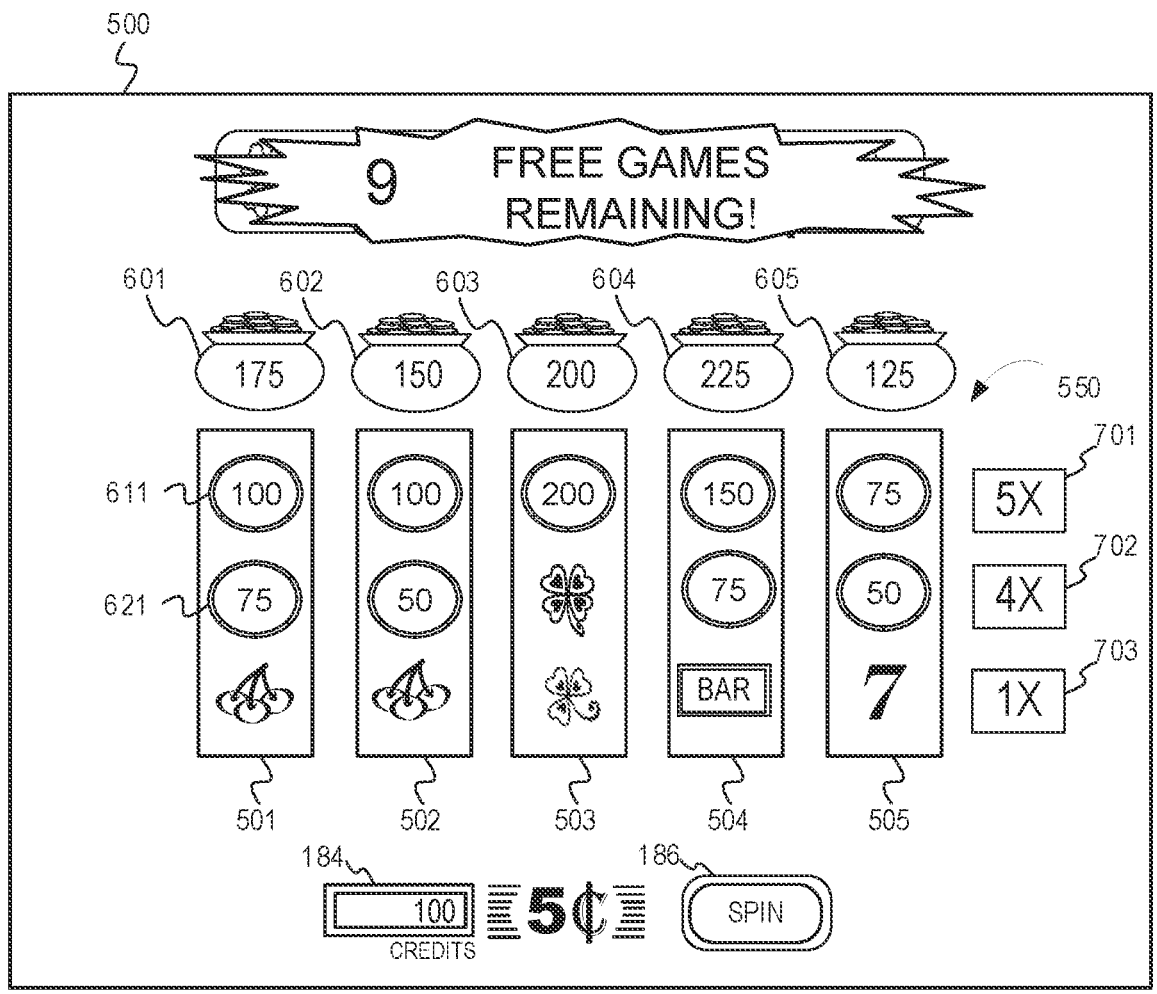

One example of operations for step 310 is illustrated in the data processing method shown in FIG. 4. Referring to FIG. 4, at step 402, the game-logic circuitry determines whether a minimum number of value-bearing symbols has appeared in the array 550 (e.g., minimum of five value-bearing symbols). If the number of value-bearing symbols in the array 550 is less than five, operations continue at step 330. If however, the game-logic circuitry determines that five or more value-bearing symbols appear in the array 550, then the game-logic circuitry continues to step 404 for a repeating loop. In each instance of the loop, for each value-bearing symbol that appears on the array, the game-logic circuitry performs several operations. For example, at step 406 the game-logic circuitry adds a symbol value (e.g., a credit value displayed on the symbol) from the base game to an associated column bank. At step 408, game-logic circuitry further increments a value of an associated row bank. Further, at step 410, the game-logic circuitry increments a free game counter, which the game-logic circuitry uses to track the number of free games provided (e.g., to count down the cycle of free games provided). When the loop 404 completes its operations for each value-bearing symbol presented, the loop ends at 412, and the free games are conducted continuing at step 312. FIG. 7 illustrates one example of the data flow method illustrated in FIG. 4. For instance, referring to FIG. 7, for the symbol 611, the game-logic circuitry adds the credit value of the symbol 611 to the column bank 601 for the appearance of the symbol 611 in the first column. The column bank 601 is associated with the first column of the array 550. Further, the game-logic circuitry increments a multiplier value of a row bank 701 by a value of one multiplier point for the appearance the symbol 611 in the first row. The row bank 701 is associated with the first row of the array 550. The game-logic circuitry repeats the process for the other value-bearing symbols. For example, for the symbol 621, the game-logic circuitry adds the credit value of the symbol 621 to the column bank 601. Further, the game-logic circuitry increments a multiplier value of a row bank 702 by one multiplier point for the appearance of the symbol 621 in the second row. As shown in FIG. 7, the game-logic circuitry adds each of credit values of the value-bearing symbols to their respective column banks, and increments each multiplier value of the respective row banks for the appearance of a value-bearing symbol in a row. Consequently, the column banks 601, 602, 603, 604, 605 display the cumulative credit values for each individual value-bearing symbol that appeared within a column. For example, column bank 601 displays the value "175," which is the cumulative credit value of the value-bearing symbols in the first column (e.g., the credit values on symbols 611 and 621). Column bank 602 displays the value of "150," which is the cumulative value of the value-bearing symbols in the second column (e.g., the "100" and "50" credit values on the value-bearing symbols in the second column). Column bank 603 displays the value of "200," which is the cumulative value of the symbols in the third column (e.g., the "200" credit value on the value-bearing symbol in the third column). Column bank 604 displays the value of "225," which is the cumulative value of the value-bearing symbols in the fourth column (e.g., the "150" and "75" credit values on the value-bearing symbols in the fourth column). Column bank 605 displays the value of "125," which is the cumulative values of the symbols in the fifth column (e.g., the "75" and "50" credit values on the value-bearing symbols in the fifth column). Furthermore, the row banks 701, 702, and 703 display the incremented multiplier values that cumulated for the appearance of each individual value-bearing symbol within a row. For example, row bank 701 displays the value "5×" which is the incremented multiplier value due to the appearance of five value-bearing symbols in the first row. Row bank 702 displays the value "4×" which is the incremented multiplier value due to the appearance of four value-bearing symbols in the second row. Row bank 703 displays the value "1×" which is a default, minimum multiplier value that is assigned to a row bank when no value-bearing symbols appear in the associated row. Thus, because there are zero value-bearing symbols in the third row, the game-logic circuitry assigned the row bank with the default value of "1×."

Returning momentarily to FIG. 3, at step 312, using a random number generator, the game-logic circuitry conducts a series of free games of the plurality of symbol-bearing reels. Step 312 represents a loop that repeats for each free game. Each free game involves animating the spinning and stopping of the plurality of symbol-bearing reels to randomly land symbols on the reels in the array.

At step 318, the game-logic circuitry animates column values and row values of the array. FIG. 7, for example, illustrates the animation of the column banks 601, 602, 603, 604, and 605 and the credit values displayed thereon. The column banks appear outside and directly above each of the respective reels 501, 502, 503, 504, and 505. Further, FIG. 7 illustrates the animation of the row banks 701, 702, and 703 with the multiplier values displayed thereon. The row banks also appear outside and directly beside each respective row of the array. It should be mentioned, however, that although, in the embodiment shown in FIG. 7, the position of each column value and row value is positioned near each of their respective columns and/or rows, in other embodiments the column values and row values may be positioned in other locations, yet still be related to the respective column and/or row. For example, in some embodiments, the game-logic circuitry can display column values or row values in a separate table or list, with labels or symbols that associate the particular column or row with the respective column value or row value. As mentioned, in some embodiments, the column values include credit values accrued from the appearance of one or more special symbols in the array and the row values include multiplier values. Other examples of either column values or row values include free games, scattered wilds, an increased playfield height, or other quantifiable benefits or features of the slot game.

At step 322, the game-logic circuitry determines whether a special type of symbol, referred to as a catalyst symbol, appears in the array. The catalyst symbol is a symbol that, when it appears in the array, it triggers an award whose value is based on a function of a row value and a column value for an intersecting row and column. Because, the value of the function depends on a crossing, or intersecting, of a row and column, the catalyst symbol may be referred to as a "cross-collect" symbol in that the crossing, or intersecting, of the row and column appear, within a rectangular array configuration, as a cross shape. Further, because of the crossing of the row and column, associated column and row values are computed together, according to a function, that results in a prize that is collected. The game feature associated with the cross-collect symbol may be referred to herein as a cross-collect feature.

Figure 8:
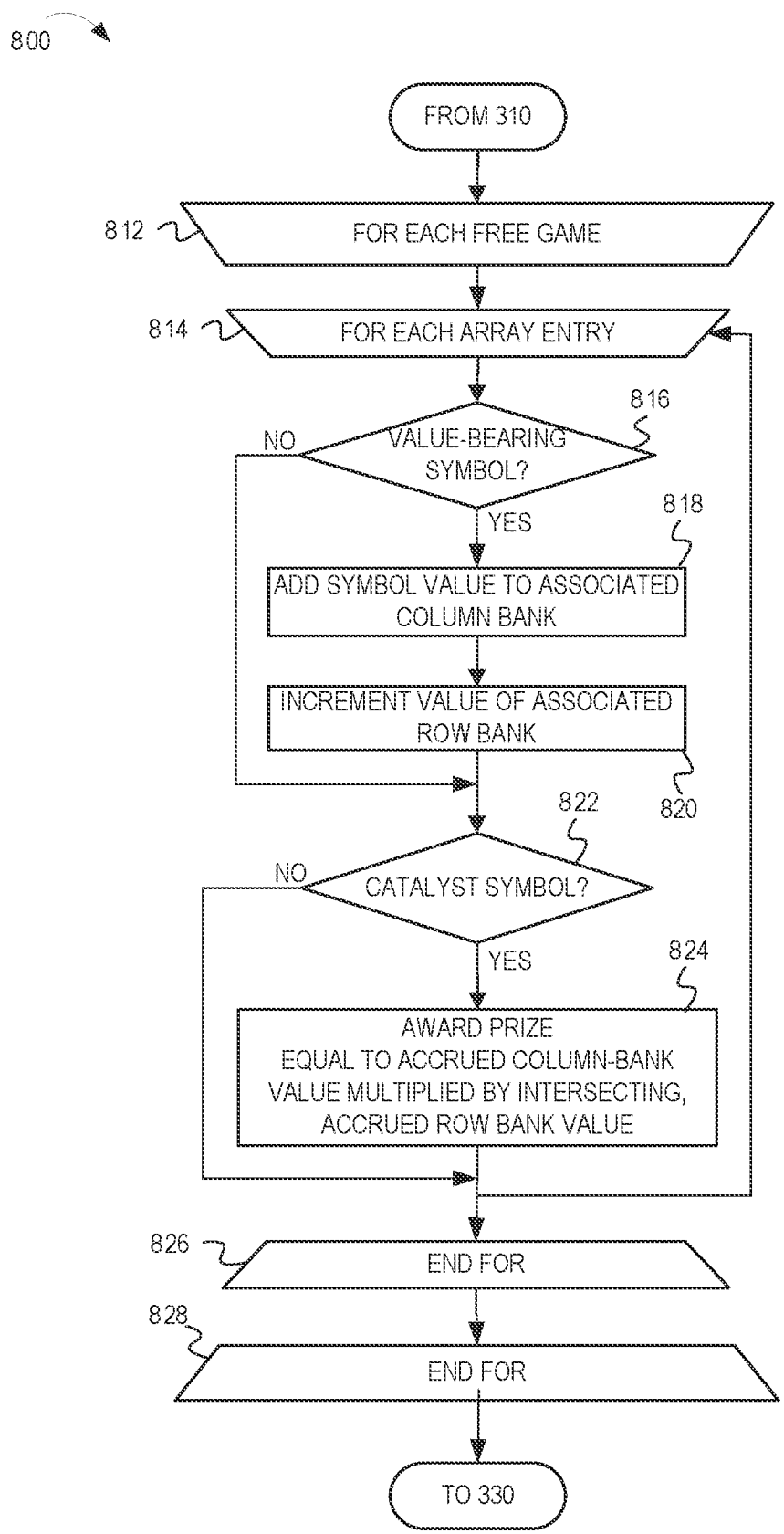
FIG. 8 is a flowchart for an algorithm that corresponds to instructions executed by a controller, according to another embodiment of the present invention.

If at step 322, the game-logic circuitry determines that a catalyst symbol does not appear in the array, then the data processing method continues at step 328 where the loop for step 312 either repeats (for any remaining free games) or ends (then continues to step 330). However, if at step 322, the game-logic circuitry determines that a catalyst symbol appears, then the data processing method proceeds to step 324 where the game-logic circuitry awards a prize that is a function of a corresponding column value and row value of an intersecting row and column for the entry location of the catalyst symbol. For instance, the game-logic circuitry determines that the catalyst symbol appears in a specific column and row of the array. The game-logic circuitry determines a corresponding column value for the specific column (e.g., an accrued credit value in a column bank). The game-logic circuitry also determines a corresponding row value for the specific row (e.g., an accrued multiplier value in a row bank). The game-logic circuitry computes a function that uses the corresponding column value and row value. For instance, the game-logic circuitry multiplies the column value by the row value. In other embodiments, the game-logic circuitry performs other functions, such as adding the column value and the row value, or performing any type of logical or mathematical operation, including, but not limited to multiplication, addition, subtraction, division, negation, concatenation, etc. FIG. 8 illustrates an embodiment where the game-logic circuitry modifies (e.g., augments or accrues) the column values and row values for each value-bearing symbol that appears in a respective row or column. Further, FIG. 8 illustrates awarding a prize in response to appearance of a specific type of catalyst symbol (e.g., a "cross-collect" symbol). FIG. 9-12 will be referred to in conjunction with the description of FIG. 8.

Figure 9:
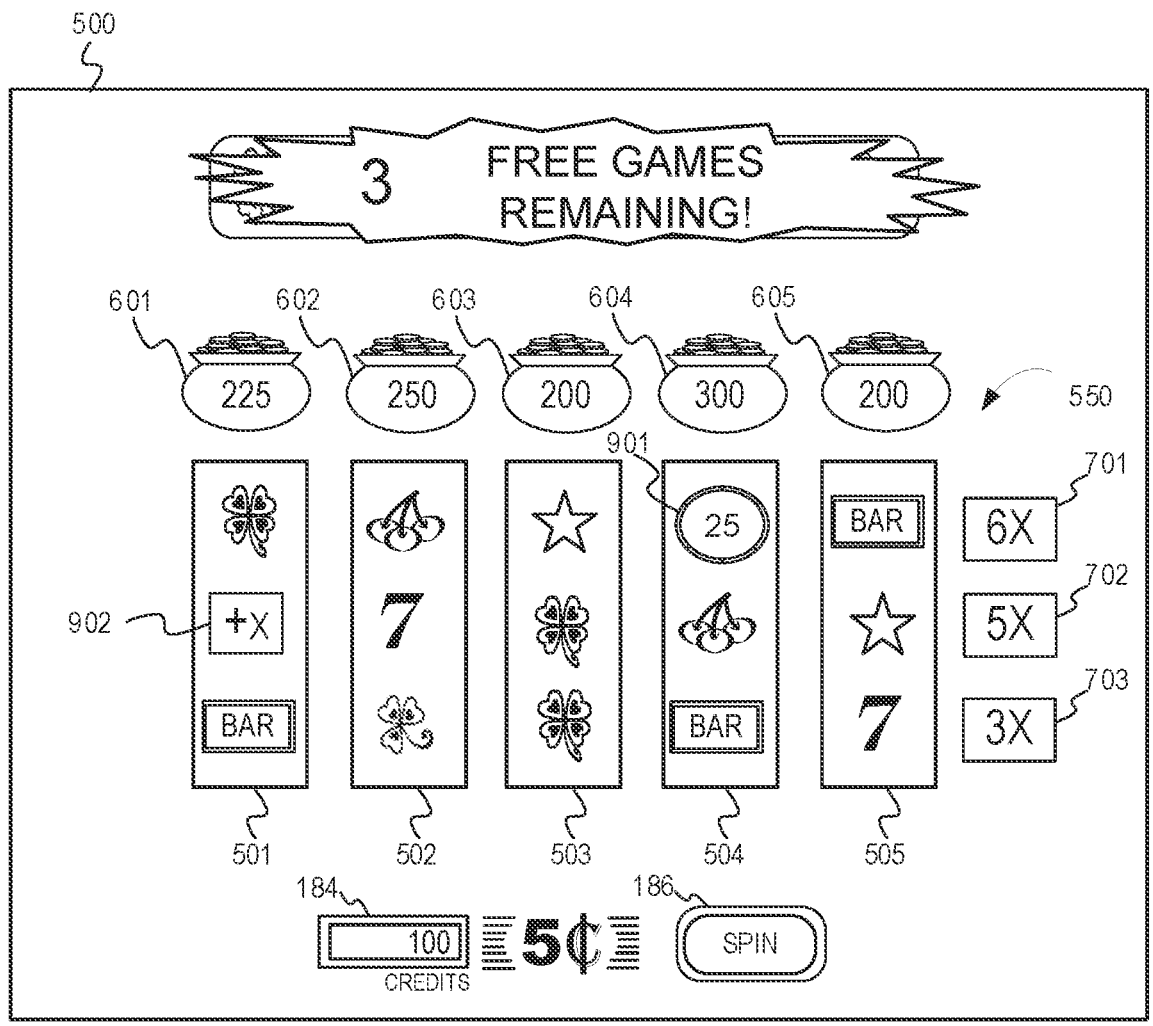
FIGS. 9 through 12 are diagrams of game features illustrating aspects of the embodiment in FIG. 3 and/or FIG. 8.
Figure 10:
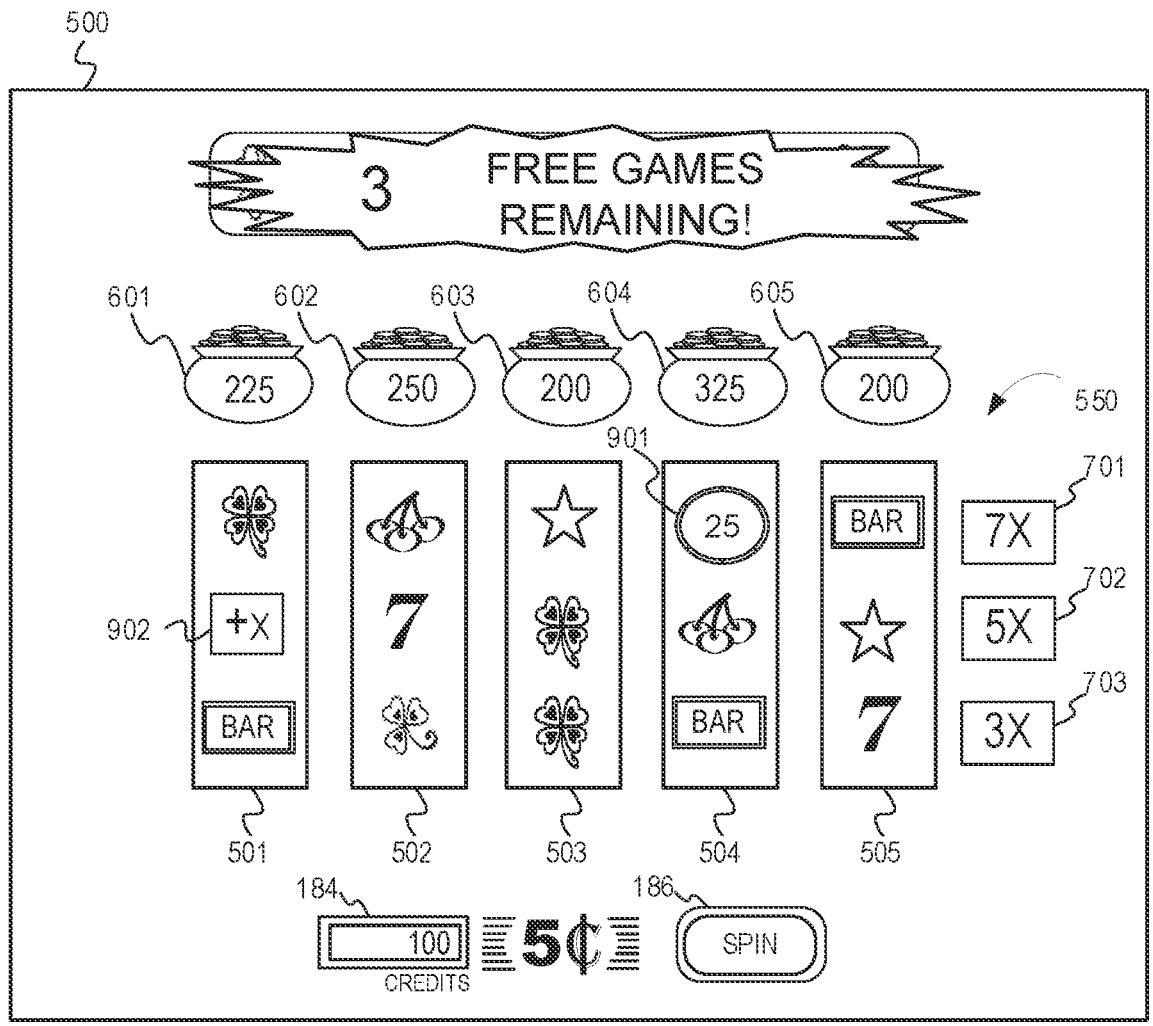
Figure 11:
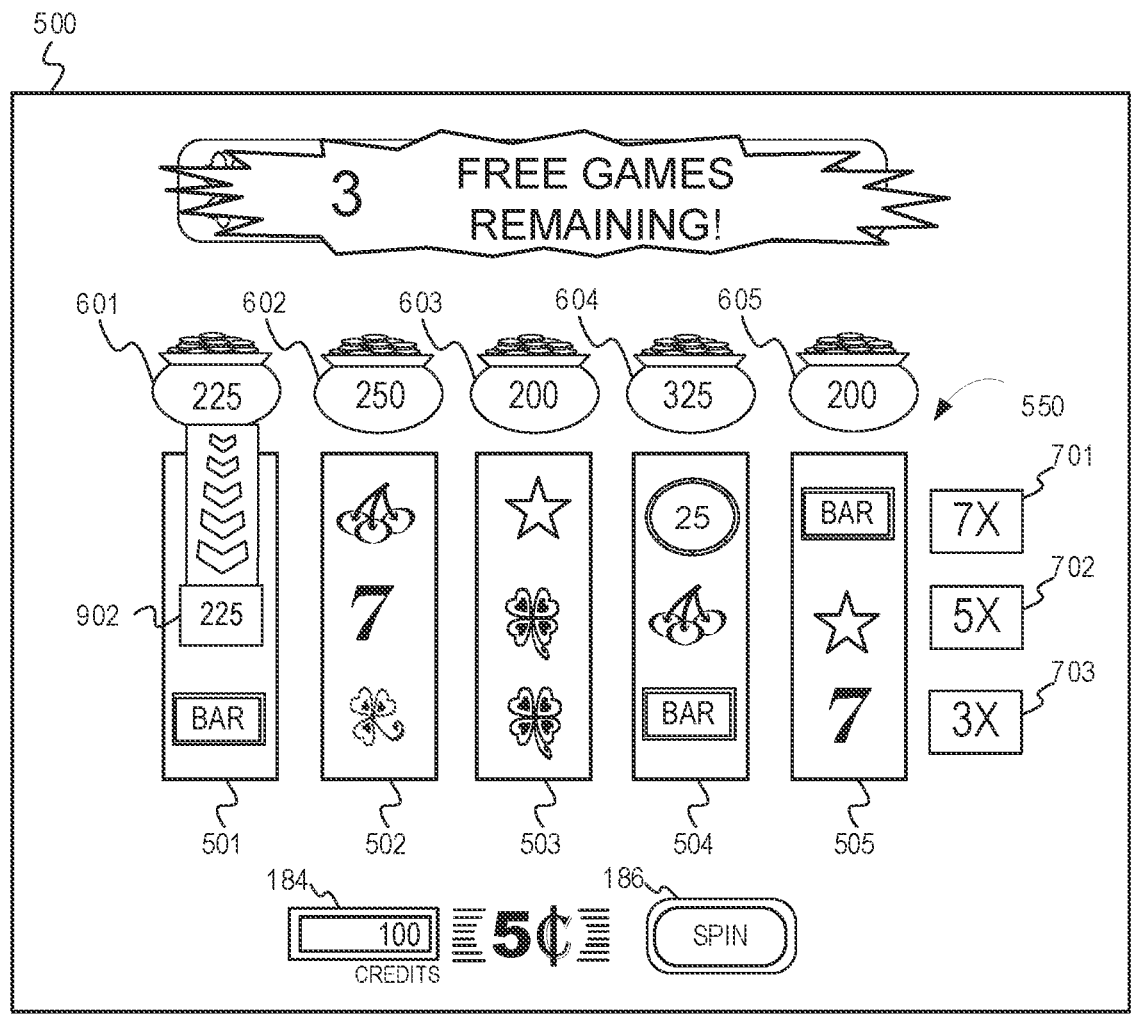
Figure 12:
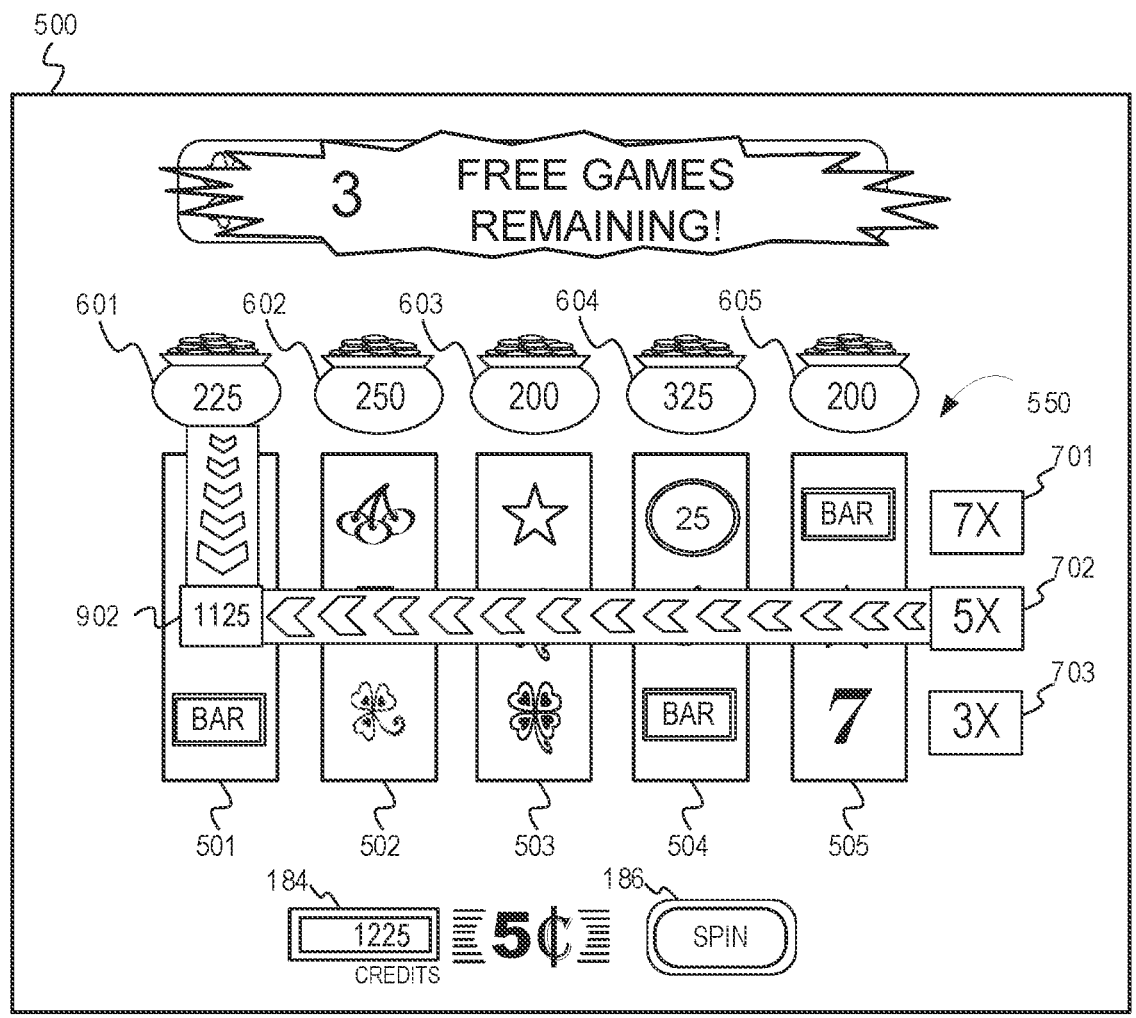

In FIG. 8, at step 812 a first loop begins that is repeated for each free game. The first loop ends at step 828 after all of the free games are conducted. In the first loop is a second, loop that begins at step 814. The game-logic circuitry repeats the second loop for each array entry (e.g., for each symbol presented on the array), then ends at step 826. For example, at step 816, the game-logic circuitry determines whether any value-bearing symbols appear during any of the free games. If a value-bearing symbol appears in the array, then at step 818, the game-logic circuitry adds a symbol value (e.g., a credit value displayed on the symbol) to an associated column bank. Further, at step 820 the game-logic circuitry increments a value (e.g., a multiplier value) of an associated row bank. Then, at step 822, the game-logic circuitry determines whether a catalyst symbol appears in the array. If the catalyst symbol appears, the game-logic circuitry awards a prize whose value is equal to an accrued column-bank value multiplied by an accrued row bank value of an intersecting row and column. For instance, in FIG. 9, during the initial five free games (out of the original nine free games provided) game-logic circuitry determined that no catalyst symbol appeared. Instead, value-bearing symbols appeared randomly on the reels 501, 502, 503, 504, and 505 during one or more of the initial five free games. Each time a value-bearing symbol appeared, the game-logic circuitry added the credit value displayed on the value-bearing symbol to a respective one of the column banks 601, 602, 603, 604, and 605. Further, for each value-bearing symbol that appeared, the game-logic circuitry incremented a multiplier value to a respective one of the row banks 701, 702, or 703. FIG. 9 illustrates the sixth free game out of the nine originally awarded free games. During the sixth free game, the game-logic circuitry first determines (e.g., as at step 816) that the value-bearing symbol 901 appears in the array 550. Consequently, the game-logic circuitry adds (e.g., as at step 818) the credit value (i.e., the "25" credit value on the value-bearing symbol 901) to the column bank 604. FIG. 10 illustrates the addition of the "25" credits from the value-bearing symbol 901 to the column bank 604. Further, in FIG. 10, the game-logic circuitry increments (e.g., as at step 820) the row bank 701 by one in response to appearance of the symbol 901 in the first row. Subsequently, the game-logic circuitry determines (e.g., as at step 822) that a catalyst symbol 902 appears in the array entry that corresponds to an intersection of the first column and the second row. In other words, the catalyst symbol 902 appears at the location in the array 550 that corresponds to the index entry value of (2,1), which refers to the intersection of the second row and the first column. Thus, the game-logic circuitry selects, based on the location of the cross-collect symbol 902, the column bank 601 (associated with the first column) and the row bank 702 (associated with the second row). The game-logic circuitry then awards a prize (e.g., as at step 824) by performing a function that uses the value of the column bank 601 and the value of the row bank 702, such as multiplying the value of the column bank 601 by the value of the row bank 702. For instance, as illustrated in FIG. 11, the game-logic circuitry animates a computation of the function by first presenting the accrued value of the column bank 601 on the symbol 902; then, as illustrated in FIG. 12, the game-logic circuitry multiplies the accrued value of the column bank 601 by the multiplier value in the row bank 702 (e.g., 225 credits×5=1125 credits). The game-logic circuitry further awards the prize by adding the won credits (i.e., the 1125 credits) to the credit meter 184.

Multiple catalyst symbols can be presented in the array during any given free game. Thus, the game-logic circuitry can award a prize for each catalyst symbol that appears. In some embodiments, the column values and row values continue to accrue and do not diminish until the free games are conducted, at which time the column and row values can be removed from presentation on the electronic display. In other embodiments, the game-logic circuitry can, in response to an event in one of the games, (e.g., during one of the free games), reduce any of the column values or the row values by any amount. For instance, in one embodiment, after a prize is awarded (in response to appearance of a catalyst symbol), the game-logic circuitry can reduce a column value or row value to a default minimal value. For instance, after the prize is awarded, the game-logic circuitry can reduce an accrued credit value in a column bank and/or reduce (e.g., decrement) a multiplier value of a row bank. In some embodiments, the game-logic circuitry can reduce (or reset) column values and/or row values based on timing (e.g., reduce a bank value after a certain number of seconds or minutes after appearance of a special symbol) or based on a count (e.g., reduce a bank value after a certain number of games are played or after a certain number of spins occur in either a feature game or in a base game).

Referring again to FIG. 3, at step 330, the game-logic circuitry determines whether or not it has received a cashout input via at least one of the one or more electronic input devices of the gaming machine. If it has not received a cashout input, the game-logic circuitry waits for the next wager input at step 306. If it has received a cashout input, the game-logic circuitry initiates a payout from the credit balance on the credit meter. The data processing method then ends at step 332.

In some embodiments (e.g. as described in FIG. 3 through FIG. 12) the game-logic circuitry presents column values and row values during free games and awards a prize in response to appearance of a catalyst symbol in a free game. However, in other embodiments, the game-logic circuitry can present column values and row values as persistent objects across base games. The game-logic circuitry can further award prizes for appearance of a catalyst symbol in a base game (e.g., as described in FIG. 13).

Figure 13:
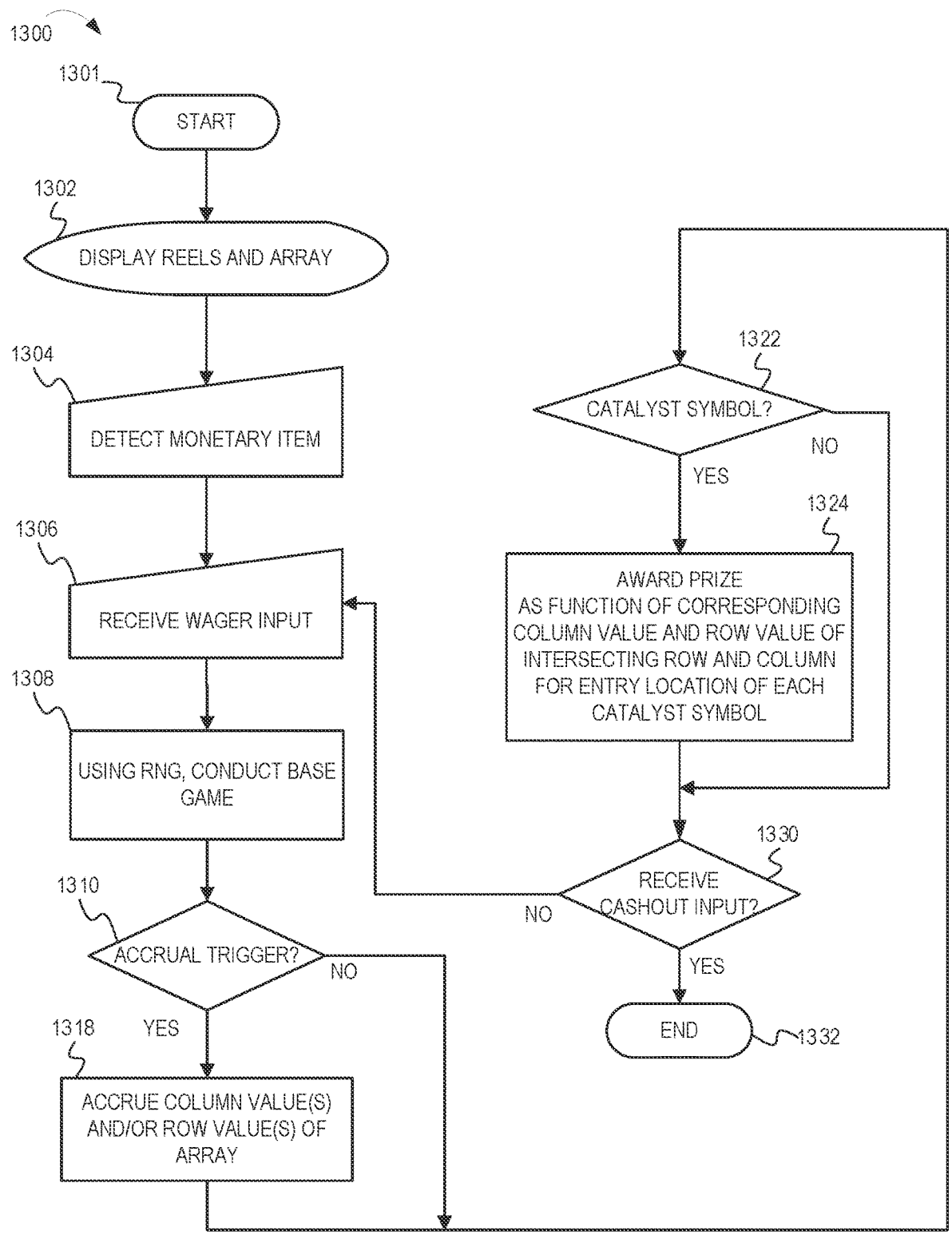
FIG. 13 is a flowchart for an algorithm that corresponds to instructions executed by a controller, according to another embodiment of the present invention.

Referring now to FIG. 13, there is shown a flowchart representing one data processing method flow ("flow 1300") corresponding to at least some instructions stored and executed by the game-logic circuitry 240 in FIG. 2 to perform operations according to an embodiment of the present invention. The operations are described below in conjunction with FIG. 14 through FIG. 18, which depict diagrams associated with one or more game features (e.g. a game cycle and/or series of game cycles) illustrating aspects of this embodiment.

Figure 14:
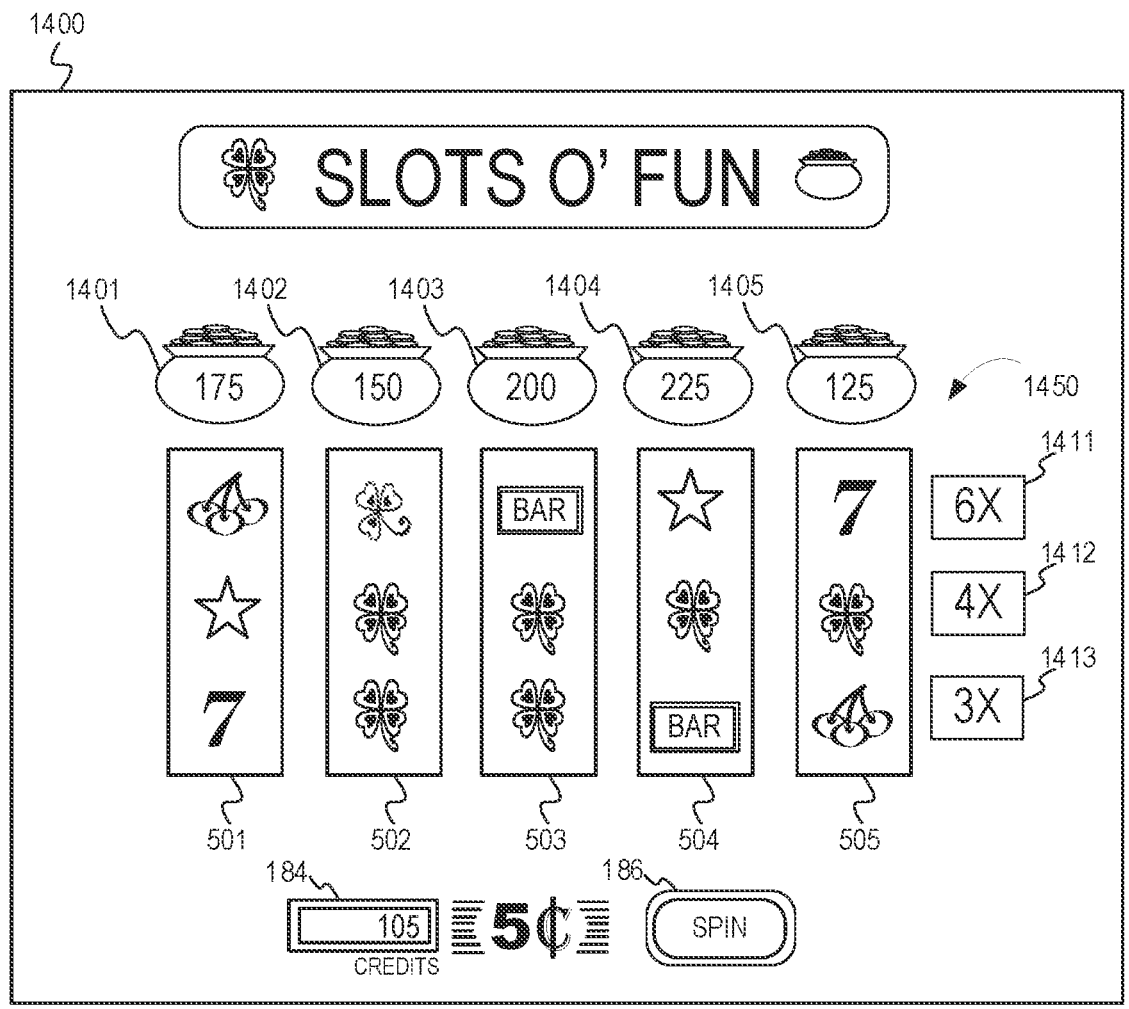
FIG. 14 through FIG. 18 are diagrams of game features illustrating aspects of the embodiment in FIG. 13.

The flow 1300 commences at step 1301. At step 1302, the game-logic circuitry directs an electronic display device (e.g., video display) of the gaming machine to display a plurality of symbol-bearing reels and an array of symbol positions, as similarly described for step 302 in FIG. 3. The game-logic circuitry also presents (e.g., animates) column and row values in association with the array during the base game. The column and row values can persist over a series of base games. For example, as illustrated in FIG. 14, game-logic circuitry presents, via a display 1400, the reels 501, 502, 503, 504, and 505. The game-logic circuitry also presents column banks 1401, 1402, 1403, 1404, and 1405 as well as row banks 1411, 1412, and 1413. The column banks 1401, 1402, 1403, 1404, and 1405 and row banks 1411, 1412, and 1413 persist across a series of base games.

Referring again to FIG. 13, at step 1304, the game-logic circuitry detects, via at least one of one or more electronic input devices, a physical item associated with a monetary value that establishes a credit balance, as similarly described for step 304 in FIG. 3.

At step 1306, the game-logic circuitry initiates a wagering game cycle in response to an input indicative of a wager covered by the credit balance, as similarly described for step 306 in FIG. 3.

At step 1308, using an RNG, the game-logic circuitry conducts a base game by animating the spinning and stopping of the plurality of symbol-bearing reels to randomly land symbols on the reels in an array, as similarly described for step 308 in FIG. 3. FIG. 14 illustrates the reels 501, 502, 503, 504 and 505 after they have been spun and stopped to randomly populate an array 1450 with symbols.

Figure 15:
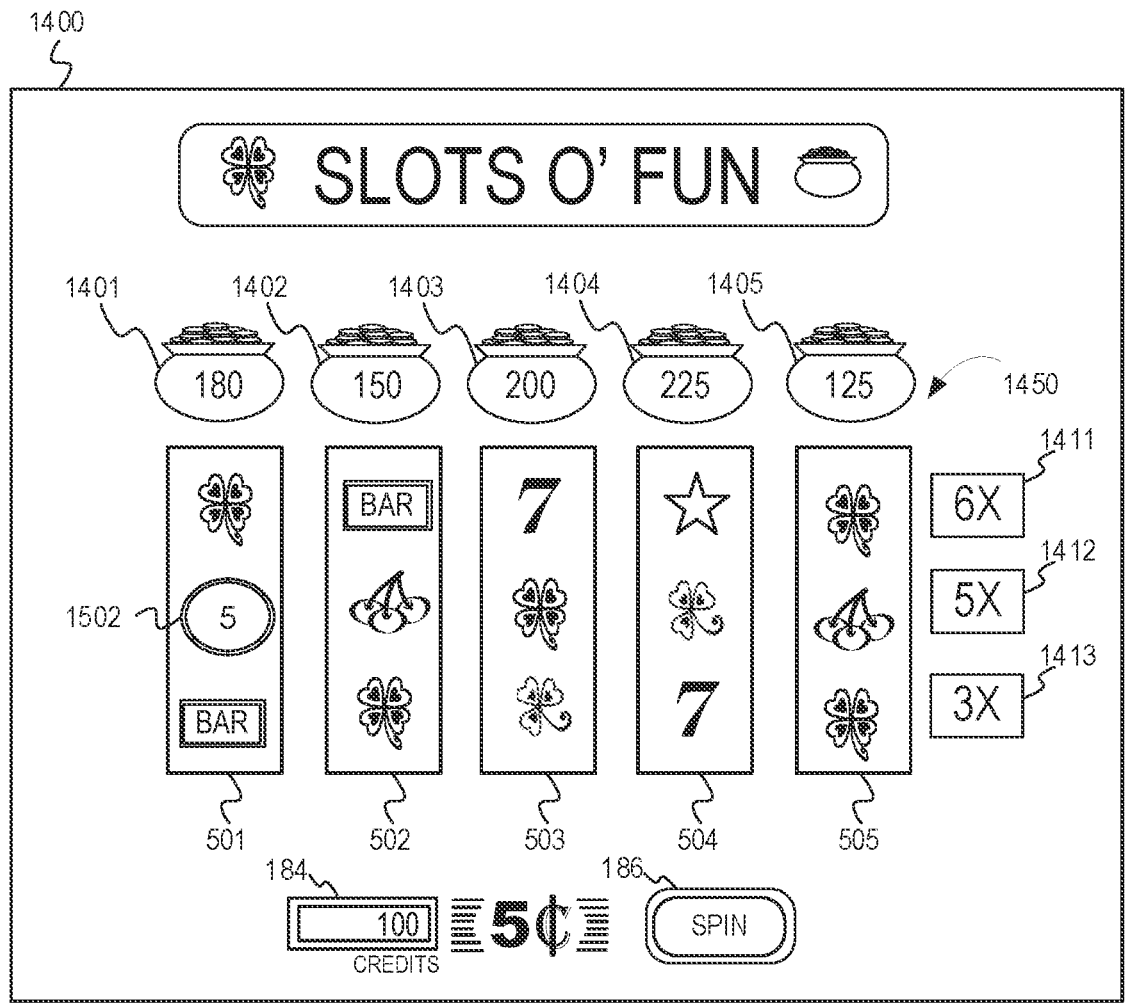

At step 1310, the game-logic circuitry determines whether or not a particular event occurs, during a base game, which triggers accrual of column and/or row values. If the event has occurred, then the method flow 1300 continues at step 1318 wherein the game-logic circuitry accrues column values and/or row values. In one embodiment, the game-logic circuitry accrues the values in response to appearance of a special symbol in the base game, such as value-bearing symbol 1502 shown in FIG. 15. Referring to FIG. 15, in response to detecting appearance of the value-bearing symbol 1502 in the first column of the array 1450, the game-logic circuitry adds the credit value on the value-bearing symbol 1502 to the associated column bank 1401. Further, in response to detecting the appearance of the symbol 1502 in the second row, the game-logic circuitry increments a multiplier value for the associated row bank 1412.

Figure 16:
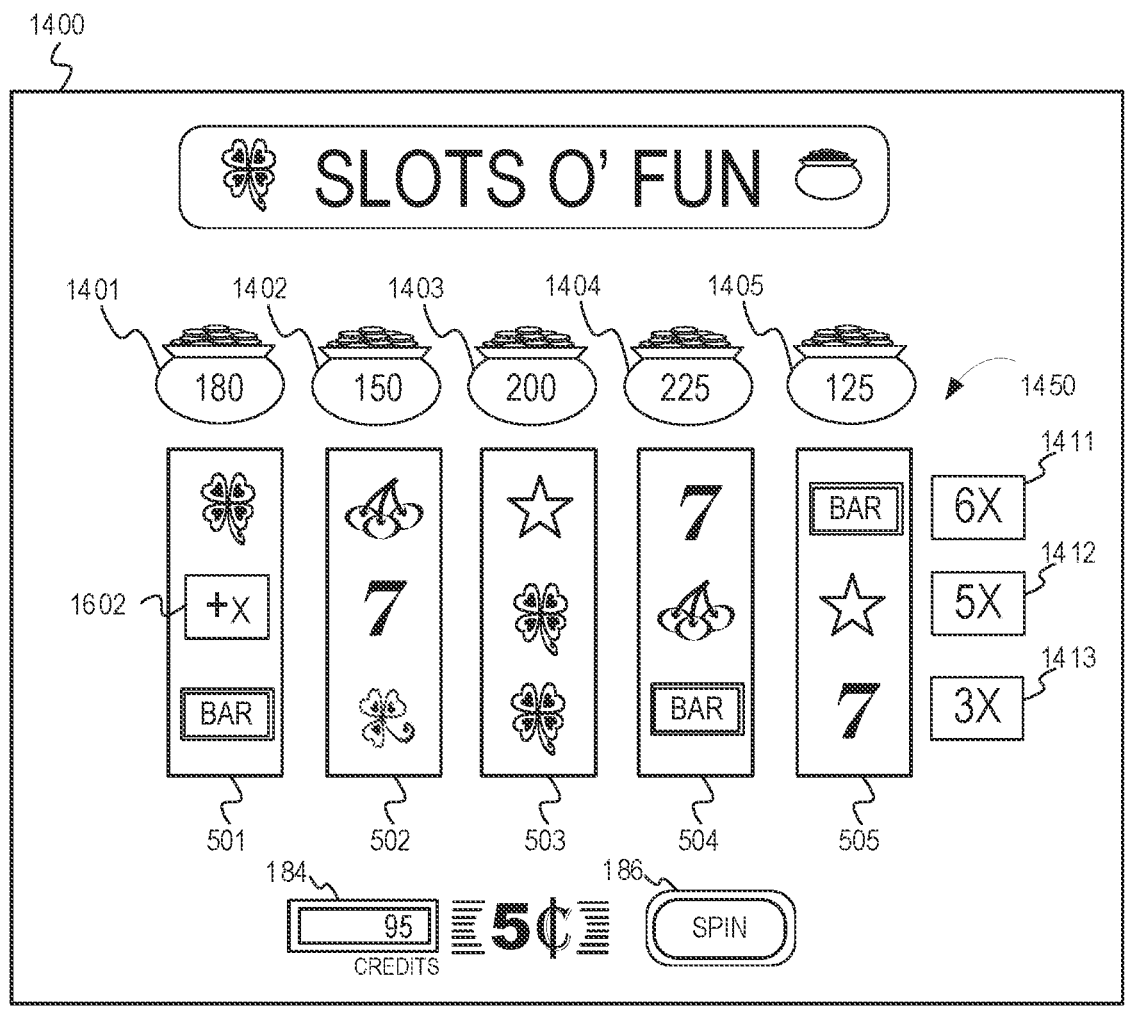
Figure 17:
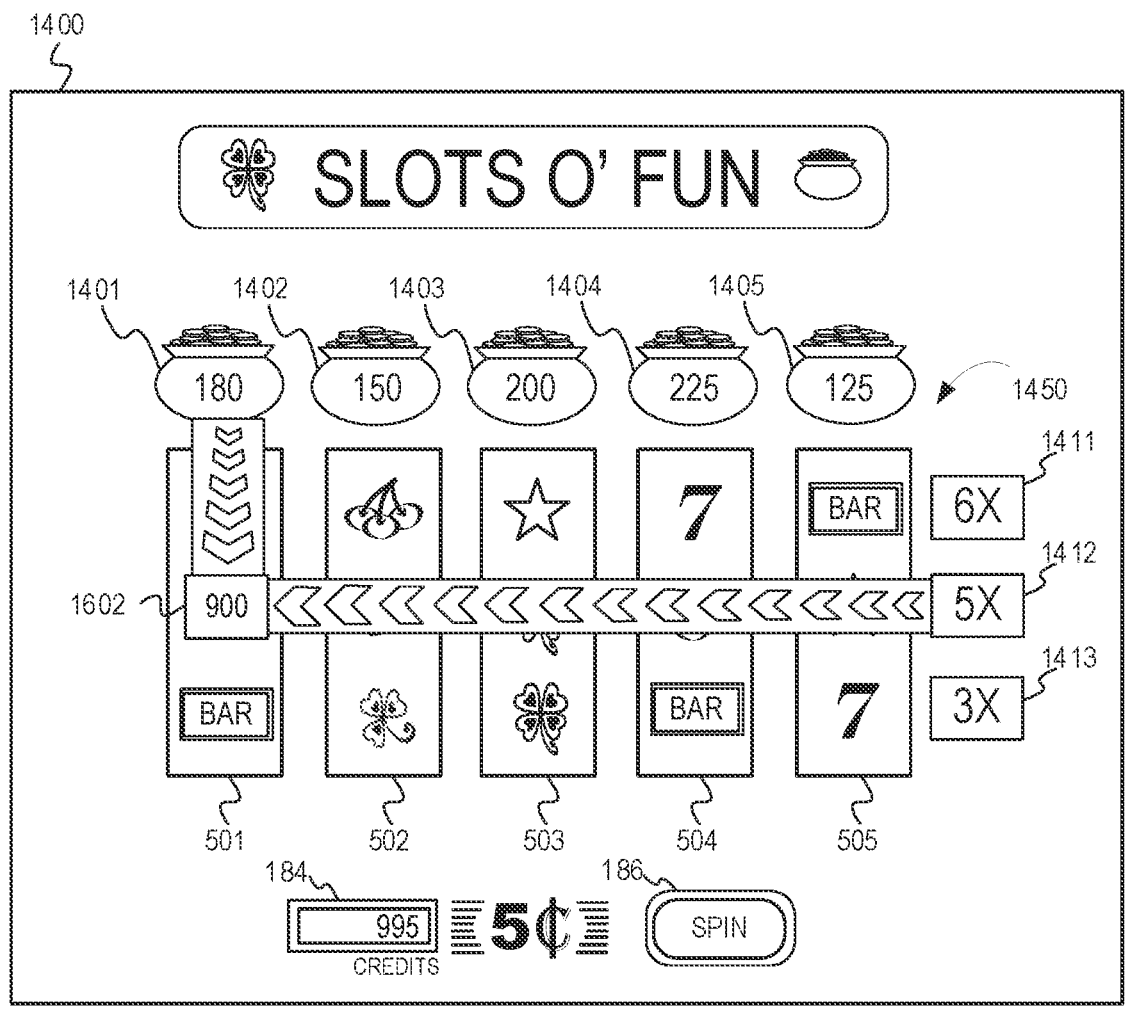
Figure 18:
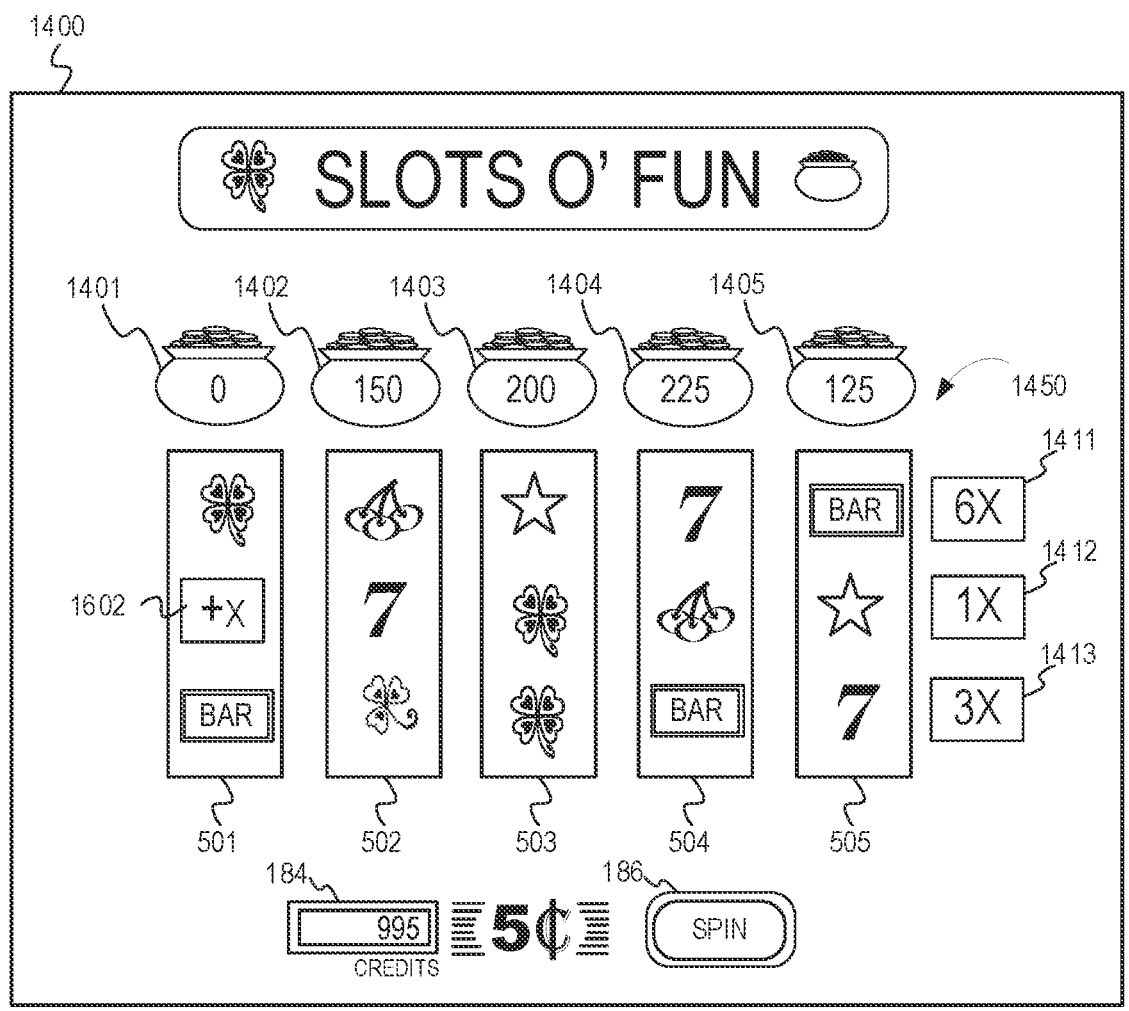

Referring again to FIG. 13, at step 1322, the game-logic circuitry determines whether a catalyst symbol appears in the array. If at step 1322, the game-logic circuitry determines that a catalyst symbol does not appear in the array, then the data processing method continues at step 1330. However, if at step 1322, the game-logic circuitry determines that a catalyst symbol appears, then the data processing method proceeds to step 1324 where the game-logic circuitry awards a prize that is a function of a corresponding column value and row value of an intersecting row and column for the entry location of the catalyst symbol. For example, FIG. 16 illustrates the appearance of a catalyst symbol 1601 during a base game. In response to detecting the appearance of the catalyst symbol 1601, the game-logic circuitry awards a prize as shown in FIG. 17. For example, the game-logic circuitry determines a prize value by multiplying the credit value accrued in the column bank 1401 by the multiplier value accrued in the row bank 1412 (e.g., 180 credits×5=900 credits). The game-logic circuitry adds the prize value (e.g., the 900 credits) to the credit meter 184. In one embodiment, as illustrated in FIG. 18, in response to the prize being awarded for the appearance of the symbol 1601, the game-logic circuitry optionally reduces the value of either the column bank or the row bank. For example, in FIG. 18, the game-logic circuitry reduces the value of the column bank 1401 to a value of zero. The game-logic circuitry also reduces the value of the row bank 1412 to a default minimum value of one (i.e., "1×"). As shown for FIG. 18, the appearance of the catalyst symbol 1602 resets the values for the column bank 1401 and the row bank 1412 after a prize is awarded. However, in other embodiments, the game-logic circuitry can reset (or otherwise reduce) column and/or row values in response to appearance of another symbol (e.g., a reset symbol) that is different from the catalyst symbol 1602.

Referring again to FIG. 13, at step 1330, the game-logic circuitry determines whether or not it has received a cashout input via at least one of the one or more electronic input devices of the gaming machine. If it has not received a cashout input, the game-logic circuitry waits for the next wager input at step 1306. If it has received a cashout input, the game-logic circuitry initiates a payout from the credit balance on the credit meter. The data processing method then ends at step 1320.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of generating a graphical user interface (GUI) via an electronic display device of a gaming machine, the gaming machine including a gaming cabinet and game-logic circuitry secured within a locked box inside the gaming cabinet, the game-logic circuitry including memory storing programming for a random number generator (RNG) and one or more games, the method comprising the operations of:

prior to executing the one or more games, executing an authentication program on the gaming machine to authenticate the programming;

animating, for a first game, a first-game display area for row and column value persistence outside of a game array of a second game, wherein the first game and second game are different types of games, wherein the first game is a first type of game that uses persisted GUI objects across a series of electro-mechanically generated game cycles of the second game, wherein the second game is a second type of game that does not use persisted GUI objects across the series of electro-mechanically generated game cycles, and wherein the second type of game uses a plurality of mechanical symbol-bearing reels;

mapping, in response to user input of the gaming machine via use of a game array model template that is based on orientations of columns and rows of the game array, a correlation between orientations and positions of persisted column and row banks of the first game to orientations and positions of entries of the game array for the second game, wherein the plurality of mechanical symbol-bearing reels for the second game are aligned inside the array according to the columns and rows, and wherein the mapping further correlates a particular symbol position on the reels to a triggering symbol;

detecting, by the game-logic circuitry using the random number generator, gaming content for the series of electro-mechanically generated game cycles for the second game, wherein detecting the gaming content, comprises detecting, by the game-logic circuitry for each of the series of electro-mechanically generated game cycles, spinning and stopping of the plurality of mechanical symbol-bearing reels to land symbols on the reels in the array, wherein the symbols comprise standard game symbols, the triggering symbol, and one or more value bearing symbols, and wherein the landed symbols are configured inside the array according to the columns and rows;

animating, by the game-logic circuitry via the display device in the first-game display area, for at least one of the columns, a persisted column bank symbol that displays an incrementable column value, wherein the persisted column bank symbol is positioned, using the mapping of the game array model template as a reference, outside a boundary of the array in alignment with the at least one of the columns, and wherein the persisted column bank symbol persists the incrementable column value across the series of electro-mechanically generated game cycles;

animating, by the game-logic circuitry via the display device in the first-game display area, for at least one of the rows, a persisted row bank symbol that displays an incrementable row value, positioned, using the mapping of the game array model template as a reference, outside of the array in alignment with the at least one of the rows, wherein the persisted row bank symbol persists the incrementable row value across the series of electro-mechanically generated game cycles;

identifying, by the game-logic circuitry using the mapping of the game array model template as a reference during the one or more of the series of electro-mechanically generated game cycles in which at least one value bearing symbol lands, an array index value stored in the memory, wherein the array index value corresponds to a position of the at least one value bearing symbol within the array;

animating, by the game-logic circuitry based on the identified array index value, a first increase to the incrementable column value and a second increase to the incrementable row value, wherein the persisted column bank symbol and the persisted row bank symbol are each aligned, via the game array model template, to display coordinates of an array entry for the array index value; and in response to detecting a random appearance of the triggering symbol of the second game in the array entry during the series of electro-mechanically generated-game cycles, identifying, via electronic access by the game-logic circuitry to the secure memory storage device and based on reference to the mapping of the game array model template, that display coordinates for the particular symbol position of the triggering symbol corresponds to the array entry associated with the index value, and animating, by the game-logic circuitry relative to the entry location based on reference to the mapping of the game array model template, a cross-collect animation on the first-game display area and positioned superimposed over the array via the GUI, wherein animating the cross-collect animation is based on access to the memory, wherein animating the cross-collect animation comprises animating, using the mapping of the game array model template as a reference, an intersection effect that physically originates respectively at each of correlated positions outside of the array for the persisted row bank symbol and for the persisted column bank symbol, wherein animating the intersection effect extends from each of the correlated positions across a boundary of the array and connects, at the position of the entry location, via animation over the at least one of the columns and the at least one of the rows, wherein the animating the cross-collect animation further comprises animating a value that is based on a function of the incrementable column value multiplied by the incrementable row value, and wherein the animating the cross-collect animation improves operation of the gaming machine to highlight volatility of the second type of game in relationship to the first type of game using the row and column value persistence over the series of electro-mechanically generated game cycles.

2. The method of claim 1, wherein said animating the first increase to the incrementable column value comprises animating, by the game-logic circuitry, an addition of a credit value displayed on the at least one value-bearing symbol to a first animated bank that corresponds to the persisted column bank symbol.

3. The method of claim 2, wherein said animating the second increase to the incrementable row value further comprises animating, by the game-logic circuitry, an increment to a multiplier value of a second animated bank that corresponds to the row bank symbol.

4. The method of claim 3, wherein the first animated bank displays an accrued credit value of the at least one of the columns, wherein the second bank displays an accrued multiplier value of the at least one of the rows, and wherein said animating the cross-collect animation is in response to multiplying, by the game-logic circuitry, the accrued credit value by the accrued multiplier value.

5. The method of claim 1, wherein the series of electro-mechanically generated game cycles comprise outcomes for the first game and a plurality of free games, and said method further comprising:

determining, by the game-logic circuitry, that a number of value-bearing symbols that appear in the first game meets a threshold; and in response to determining that the number of value-bearing symbols that appear in the first game meets the threshold, triggering, by the game-logic circuitry, the plurality of free games, wherein a number of the free games equates to the number of value-bearing symbols that appeared in the first game.

6. The method of claim 5, wherein the triggering symbol appears in the array during one of the plurality of free games.

7. The method of claim 1, wherein in response to an event in one of the series of electro-mechanically generated game cycles, animating a reduction, by the game-logic circuitry, of one or more of the incrementable column value or the incrementable row value.

8. The method of claim 7, wherein the event comprises one or more of generating a set number of games, or presentation of a reset symbol within the array.

9. The method of claim 1, wherein one or more of the incrementable column value or the incrementable row value comprises one or more of credits, multipliers, free games, scattered wilds, or an increased playfield height.

10. The method of claim 1, wherein identifying that the display coordinates for the particular symbol position of the triggering symbol correspond to the array entry associated with the index value comprises automatically retrieving, by the game-logic circuitry, data for the index value from the secure memory storage device.

11. The method of claim 10 further comprising: in response to animating either the persisted column bank symbol or the persisted row bank symbol, storing, by the game-logic circuitry in the secure memory storage device, either a respective one of the incrementable column value or the incrementable row value, wherein the game-logic circuitry stores the incrementable column value or the incrementable row value using a security setting of the gaming machine, wherein the security setting is configured according to jurisdictional security requirement established by a gaming control organization for a jurisdiction in which the gaming machine is physically located.

12. The method of claim 1, wherein the animating the cross-collect animation improves operation of the gaming machine to highlight the volatility in connection with an operation to balance a long-term yield of return for the gaming machine to a payout frequency given the RNG.

13. The method of claim 1, wherein the animating the cross-collect animation comprises superimposing the cross-collect animation on the first-game display area and over the game array.

14. The method of claim 13, wherein the animating the cross-collect animation causes the cross-collect animation to physically originate from locations on the display that correspond to a respective column bank symbol of the at least one of the columns and a respective row meter of the at least one of the rows, and wherein the superimposing causes the cross-collect animation to extend physically from the additional locations to the entry location.

15. The method of claim 1, further comprising resetting, in response to presentation of the cross-collect animation, one or more of the incrementable column value of the respective column bank or the incrementable row value of the respective row bank to a default minimal value for at least one additional one of the series of electro-mechanically generated game cycles.

16. A gaming system configured to generate a graphical user interface (GUI) via an electronic display device comprising:
 a gaming machine including the electronic display device, wherein the gaming machine is configured to display a plurality of mechanical symbol-bearing reels, wherein the gaming machine includes a gaming cabinet and game-logic circuitry secured within a locked box inside the gaming cabinet, the game-logic circuitry including memory storing programming for a random number generator (RNG), for a first game, and for a second game; and
 the game-logic circuitry, wherein the game-logic circuitry is configured to execute instructions that cause the gaming system to:
  execute, prior to executing the first game or the second game, an authentication program on the gaming machine to authenticate the programming;
  present, via the plurality of mechanical symbol-bearing reels using a random number generator, gaming content for a series of electro-mechanically generated game cycles;
  animate, for the first game, a first-game display area for row and column value persistence outside of a game array of the second game, wherein the array presents at least a portion of the plurality of mechanical symbol-bearing reels, wherein the first game and second game are different types of games, wherein the first game is a first type of game that uses persisted GUI objects across the series of electro-mechanically generated game cycles of the second game, wherein the second game is second type of game that does not use persisted GUI objects across the series of electro-mechanically generated game cycles, and wherein the second type of game uses a plurality of mechanical symbol-bearing reels;
  map, in response to user input of the gaming machine via use of a game array model template that is based on orientations of columns and rows of the game array, a correlation between orientations and positions of persisted column and row banks of the first game to orientations and positions of entries of the game array for the second game, wherein the plurality of mechanical symbol-bearing reels for the second game are aligned inside the game array according to the columns and rows, and wherein the mapping further correlates a particular symbol position on the reels to a triggering symbol;
  detect, for each of the series of electro-mechanically generated game cycles using the random number generator, a spinning and stopping of the plurality of mechanical symbol-bearing reels to land symbols on the reels in the game array, wherein the symbols comprise standard game symbols, the triggering symbol, and one or more value bearing symbols, and wherein the landed symbols are configured in the game array according to the columns and rows;
  animate for at least one of the columns in the first-game display area, a persisted column bank symbol that displays an incrementable column value, wherein the persisted column bank symbol is positioned, using the mapping of the game array model template as a reference, outside of a boundary of the game array in alignment with at least one of the columns, and wherein the persisted column bank symbol persists the incrementable column value across the series of electro-mechanically generated game cycles;
  animate for at least one of the rows in the first-game display area, a persisted row bank symbol that displays an incrementable row value, positioned, using the mapping of the game array model template as a reference, outside of the game array in alignment with the at least one of the rows, wherein the persisted row bank symbol persists the incrementable row value across the series of electro-mechanically generated game cycles;
  identify, by the game-logic circuitry using the mapping of the game array model template as a reference during the one or more of the series of electro-mechanically generated game cycles in which at least one value bearing symbol lands, an array index value stored in a secure memory storage device within a locked box of the gaming machine, wherein the array index value corresponds to a position of the at least one value bearing symbol within the game array;
  animate, by the game-logic circuitry based on the identified array index value, a first increase to the incrementable column value and a second increase to the incrementable row value, wherein the persisted column bank symbol and the persisted row bank symbol are each aligned, via the game array model template, to display coordinates of an array entry for the array index value; and in response to detection of a random appearance of the triggering symbol in the array entry during the series of electro-mechanically generated game cycles, identify, via electronic access to the secure memory storage device and based on reference to the mapping of the game array model template, that display coordinates for the particular symbol position of the triggering symbol corresponds to the array entry associated with the index value, and animate, relative to the entry location based on reference to the mapping of the game array model template, a cross-collect animation on the first-game display area and positioned superimposed over the game array via the GUI, wherein animating the cross-collect animation is based on access to the memory, and wherein animation of the cross-collect animation comprises animation, using the mapping of the game array model template as a reference, of an intersection effect that physically originates respectively at each of correlated positions outside of the array for the persisted row bank symbol and for the persisted column bank symbol, wherein animation of the cross-collect animation extends from each of the correlated positions across a boundary of the array and connects, at the position of the entry location, via animation over the at least one of the columns and the at least one of the rows, wherein animation of the cross-collect animation animates a value that is based on a function of the incrementable column value multiplied by the incrementable row value, and wherein animation of the cross-collect animation improves operation of the gaming machine to highlight volatility of the second type of game in relationship to the first type of game using the row and column value persistence over the series of electro-mechanically generated game cycles.

17. The gaming system of claim 16, and wherein the game-logic circuitry is further configured to animate the first increase to the incrementable column value by adding a credit value displayed on the at least one value-bearing symbol to a first bank that corresponds to the persisted column bank symbol.

18. The gaming system of claim 17, wherein the game-logic circuitry is further configured to animate the second increase to the incrementable row value by incrementing a multiplier value of a second bank that corresponds to the persisted row bank symbol.

19. The gaming system of claim 16, wherein the series of electro-mechanically generated game cycles comprises a first game and a plurality of free games, and wherein the game-logic circuitry is further configured to:
  determine that a number of value-bearing symbols that appear in the first game meets a threshold; and
  in response to determination that the number of value-bearing symbols that appear in the first game meets the threshold, trigger the plurality of free games, wherein a number of the free games equates to the number of value-bearing symbols that appeared in the first game.

* * * * *